United States Patent
Post et al.

(10) Patent No.: US 9,069,622 B2
(45) Date of Patent: Jun. 30, 2015

(54) TECHNIQUES FOR LOAD BALANCING GPU ENABLED VIRTUAL MACHINES

(75) Inventors: Bradley Stephen Post, San Francisco, CA (US); Varadharajan Ponnappan, Sunnyvale, CA (US); Pareekshit Singh, Sunnyvale, CA (US); Winston Matthew Penfold Johnston, San Jose, CA (US); Eric Kai-hau Han, Sunnyvale, CA (US); Parag Chakraborty, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 41 days.

(21) Appl. No.: 12/895,605

(22) Filed: Sep. 30, 2010

(65) Prior Publication Data

US 2012/0084774 A1    Apr. 5, 2012

(51) Int. Cl.
*G06F 9/455*      (2006.01)
*G06F 9/50*       (2006.01)

(52) U.S. Cl.
CPC ...... *G06F 9/5088* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 5,675,762 A | 10/1997 | Bodin et al. | |
| 5,991,856 A | 11/1999 | Spilo et al. | |
| 7,263,690 B1 | 8/2007 | Shapiro | |
| 7,360,022 B2 | 4/2008 | Tian et al. | |
| 7,594,042 B2 | 9/2009 | Lim | |
| 7,725,559 B2 | 5/2010 | Landis et al. | |
| 7,797,587 B2 | 9/2010 | Vasudevan et al. | |
| 8,060,683 B2 | 11/2011 | Shultz et al. | |
| 8,169,436 B2 | 5/2012 | Rivera et al. | |
| 8,341,624 B1 * | 12/2012 | Hobbs | 718/1 |
| 8,413,144 B1 | 4/2013 | Manmohan et al. | |
| 2005/0041031 A1 | 2/2005 | Diard | |
| 2007/0143762 A1 | 6/2007 | Arnold et al. | |
| 2008/0141264 A1 | 6/2008 | Johnson | |
| 2008/0263407 A1 | 10/2008 | Yamamoto | |
| 2008/0320489 A1 | 12/2008 | Grouzdev | |
| 2009/0119541 A1 | 5/2009 | Inoue et al. | |
| 2009/0160865 A1 | 6/2009 | Grossman | |

(Continued)

FOREIGN PATENT DOCUMENTS

| | | |
|---|---|---|
| CN | 101452406 A | 6/2009 |
| CN | 101601014 A | 12/2009 |
| CN | 101739285 A | 6/2010 |

OTHER PUBLICATIONS

"Introduction to Multi-tenant Web Applications", www.pnexpert.com-Multitenants_datacenters.html, accessed Jul. 15, 2010, 6 pages.

(Continued)

*Primary Examiner* — Kenneth Tang
(74) *Attorney, Agent, or Firm* — Bryan Webster; Kate Drakos; Micky Minhas

(57) ABSTRACT

Exemplary techniques for balancing 3D graphical processor unit use among virtual machines are herein disclosed. In an exemplary embodiment, a virtualization platform can load an instance of a graphics rendering module for a virtual machine; select a GPU for the graphics rendering module to run on; and configure the virtual machine to render to the selected GPU. In addition to the foregoing, other aspects are described in the detailed description, claims, and figures.

19 Claims, 13 Drawing Sheets

(56) References Cited

U.S. PATENT DOCUMENTS

| | | | |
|---|---|---|---|
| 2009/0322784 A1 | 12/2009 | Sartori | |
| 2010/0115510 A1* | 5/2010 | Ford et al. | 718/1 |
| 2010/0125845 A1 | 5/2010 | Sugumar et al. | |
| 2010/0131944 A1 | 5/2010 | Iorio et al. | |
| 2010/0138528 A1* | 6/2010 | Frank | 709/224 |
| 2010/0138830 A1 | 6/2010 | Astete et al. | |
| 2011/0084973 A1* | 4/2011 | Masood | 345/506 |
| 2011/0131570 A1* | 6/2011 | Heim | 718/1 |
| 2012/0081355 A1 | 4/2012 | Post et al. | |
| 2012/0149464 A1* | 6/2012 | Bone et al. | 463/30 |

OTHER PUBLICATIONS

"Load Balancing Clustering", www.exforsys.com-tutorials-clustering-load-balancing-clustering.html, Exforsys Inc., accessed Jul. 15, 2010, 3 pages.

"Online Backup and Recovery of Virtual Server Environments", White Paper, Digital Iron Mountain, Nov. 2008, 1-7.

"Oracle VM Management Pack", Oracle, Oracle Data Sheet, retrieved Jul. 15, 2010, 1-5.

"System Center Virtual Machine Manager 2007 Product Overview", www.technet.microsoft.com-en-us-systemcenter-vmm-bb871026(printer).aspx, Microsoft TechNet, accessed Jul. 15, 2010, 6 pages.

"Two Technologies Combined in One Great Solution", www.lbvm.sourceforge.net, Load Balancing of Virtual Machines (LBVM), accessed Jul. 15, 2010, 1 page.

"VMotion—Seamless OS load-balancing", www.taranfx.com-vmotion-seamless-os-load-balancing, accessed Jul. 15, 2009, 3 pages.

"VMware vCenter Site Recovery Manager", www.vmware.com-products-site-recovery-manager, Data Disaster Recovery for Servers, accessed Jul. 14, 2010, 3 pages.

Cully et al., "Remus: High Availability via Asynchronous Virtual Machine Replication", NSDI'08: Proceedings of the 5th USENIX Symposium on Networked Systems Design and Implementation, San Francisco, California, (no month available) 2008, 14 pages.

Fraser et al., "Safe Hardware Access with the Xen Virtual Machine Monitor", Proceedings of the 1st Workshop on Operating System and Architectural Support for the on demand IT InfraStructure (OASIS), (no month available) 2004, 10 pages.

Jo et al., "Transparent Fault Tolerance of Device Drivers for Virtual Machines", KAIST, Department of Computer Science, Jun. 29, 2009, 1-14.

Chinese Application No. 201110308337.5: Office Action dated Oct. 15, 2013, 11 pages.

Chinese Patent application No. 201110308337.5: English summary of the office action dated Nov. 11, 2013, 14 pages.

* cited by examiner

TECHNIQUES FOR LOAD BALANCING GPU ENABLED VIRTUAL MACHINES

CROSS REFERENCE TO RELATED CASES

This application is related by subject matter to U.S. patent application Ser. No. 12/895,668, filed on Sep. 30, 2010, entitled "Dynamic Virtual Device Failure Recovery," the content of which is herein incorporated by reference in its entirety.

BACKGROUND

Virtual machine platforms enable the simultaneous execution of multiple guest operating systems on a physical machine by running each operating system within its own virtual machine. One exemplary service that can be offered by a virtual machine platform is a virtual desktop session. A virtual desktop session is essentially a personal computer environment run within a virtual machine that has its user interface sent to a remote computer. This architecture is similar to a remote desktop environment, however instead of having multiple users simultaneously connect to a server class operating system, in a virtual desktop session each user is granted access to their own commodity operating system executing in a virtual machine.

Modern operating systems render three-dimensional (3D) graphical user interfaces for 3D applications/videogames and its operating system user interface. Users enjoy the experience of interacting with a 3D environment and it would be desirable to be able to stream 3D graphics to a client in a virtual desktop session; however, enabling streaming 3D graphics is difficult for numerous reasons. For example, the act of streaming 3D graphics requires bandwidth and/or compression. Furthermore, the virtual desktop server would need to include 3D graphics processing units (GPUs), which are capable of performing 3D functions. 3D graphics processing is resource intensive and the GPUs are typically only able to render a couple of 3D graphical user interface at a time. These GPUs can quickly become overloaded if they have to render too many graphical user interfaces. Unfortunately, in a virtual desktop deployment, the GPUs may have to simultaneously render large numbers of 3D graphical user interfaces. This can cause one or more operations to timeout and the graphics drivers in turn will reset the graphics processing units, which causes the 3D applications to terminate. Accordingly, techniques for preventing GPUs from becoming overloaded and crashing are desirable.

SUMMARY

An exemplary embodiment includes a system. In this example, the system includes, but is not limited to a processor and a memory in communication with the processor when the computer system is operational. In this example, the memory can include computer readable instructions that upon execution cause the processor to assign a group of virtual machines to render 3D graphics on a first 3D graphics processing unit; determine that the first 3D graphics processing unit is overcommitted based on at least an amount of time the first 3D graphics processing unit takes to respond to commands; move a first virtual machine from the group of virtual machines to a second graphics processing unit in response to at least the determination that the first 3D graphics processing unit is overcommitted. In addition to the foregoing, other techniques are described in the claims, the detailed description, and the figures.

Another exemplary embodiment includes a computer-readable storage medium. In this example, the computer-readable storage medium includes computer readable instructions that upon execution cause a processor to estimate an amount of graphics memory utilized to render 3D graphics for the first virtual machine; select the first 3D graphics processing unit from a plurality of 3D graphics processing units in response to determining that latency values associated direct memory access transactions issued by a group of virtual machines assigned to render graphics on the first 3D graphics processing unit are less than a first threshold and that the estimated amount of graphics memory utilized to render 3D graphics is less than a second threshold; and assign the first virtual machine to render 3D graphics on the first 3D graphics processing unit. In addition to the foregoing, other techniques are described in the claims, the detailed description, and the figures.

Another exemplary embodiment includes a method. In this example, the method includes, but is not limited to estimating at least an amount of graphics memory utilized to render graphics for a virtual machine; comparing the estimated amount of graphics memory to estimated amounts of available graphics memory controlled by a plurality of 3D graphics processing units; selecting a 3D graphics processing unit from the plurality of 3D graphics processing units to render 3D graphics for the virtual machine in accordance with the comparison; and assigning the selected 3D graphics processing unit to render 3D graphics for the virtual machine. In addition to the foregoing, other techniques are described in the claims, the detailed description, and the figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
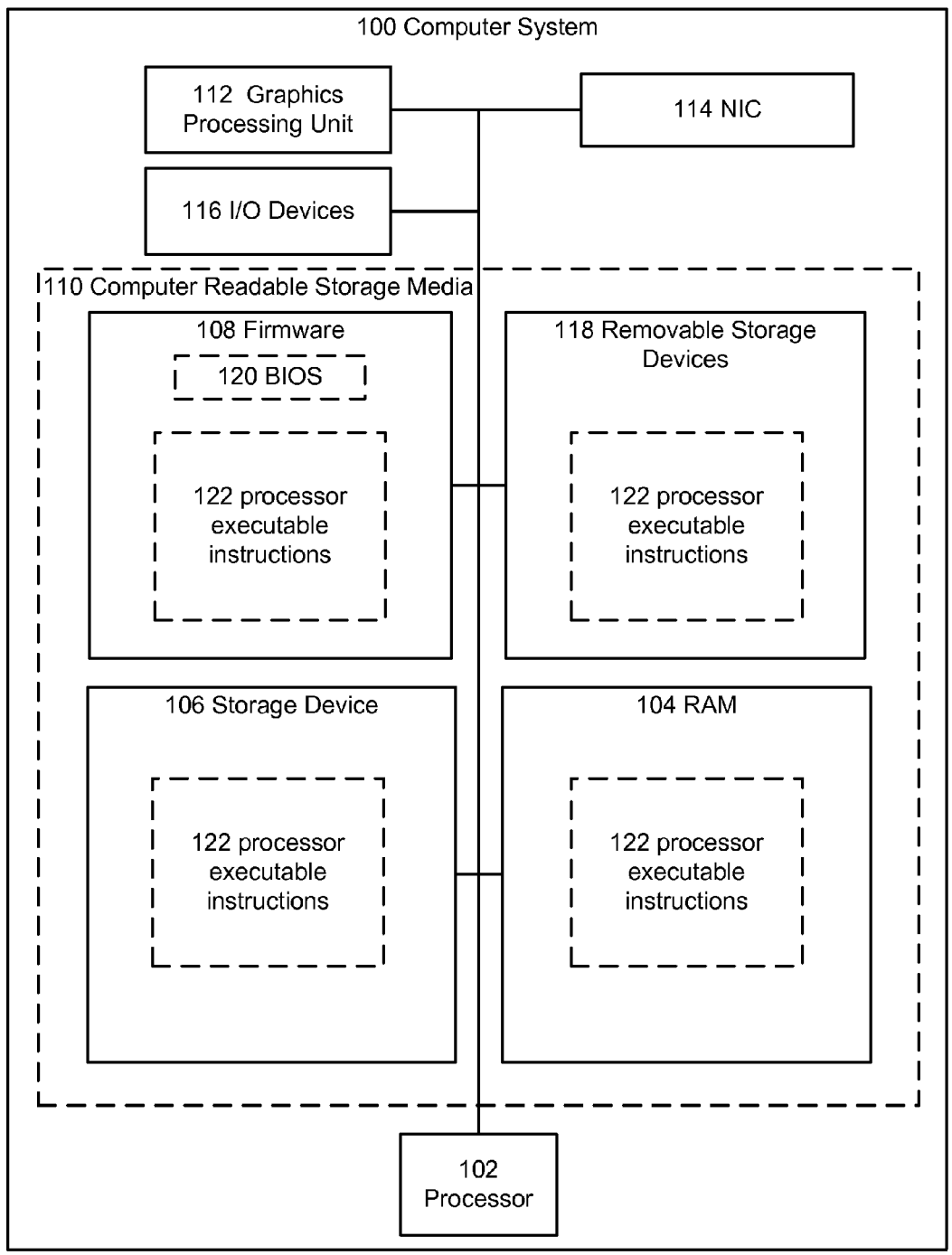
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
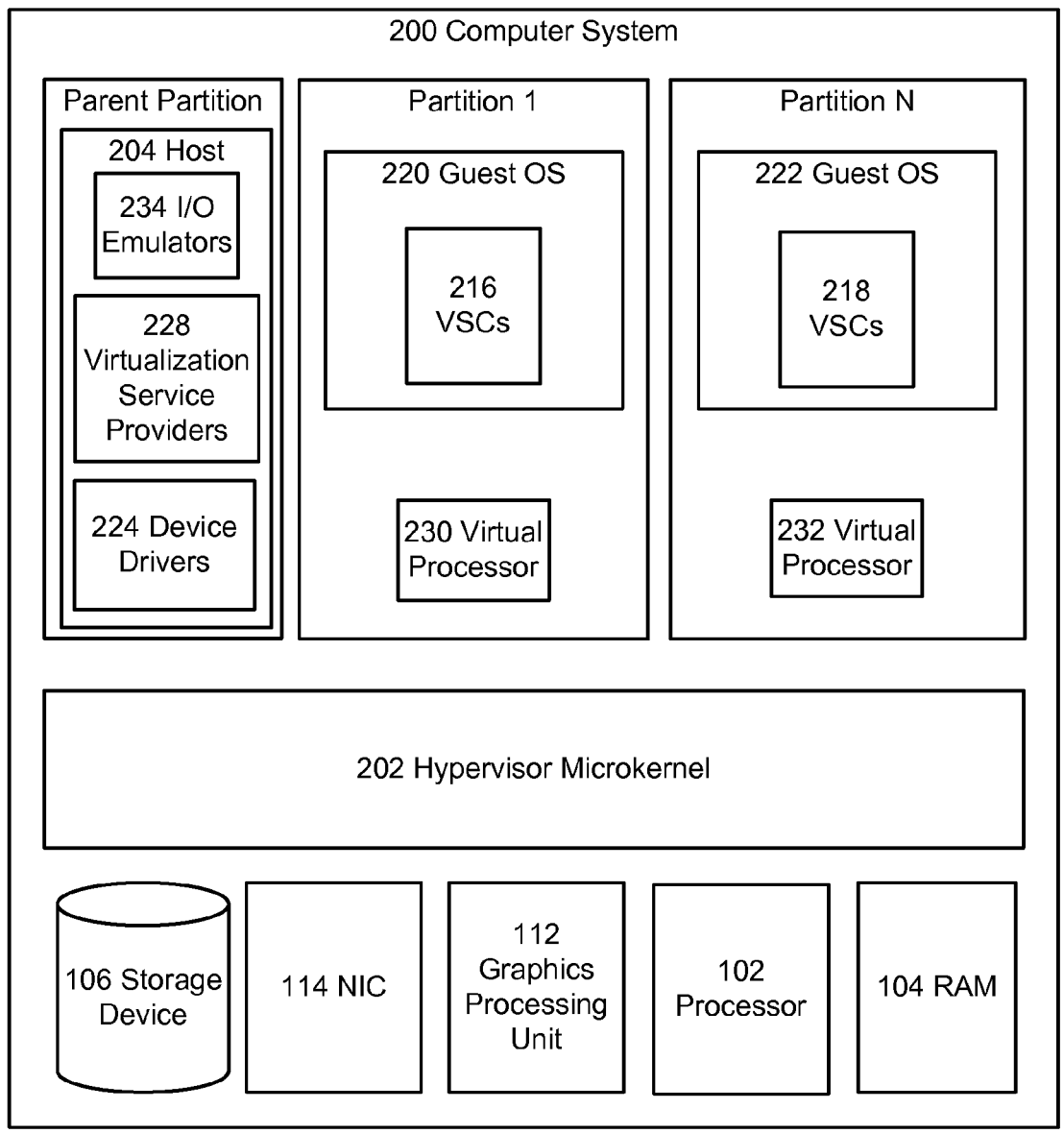
FIG. 2 depicts a high-level block diagram of a virtual machine server.

Turning to FIG. 2, illustrated is an exemplary virtualization platform that can be used to generate virtual machines. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, microkernel hypervisor 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers utilized in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
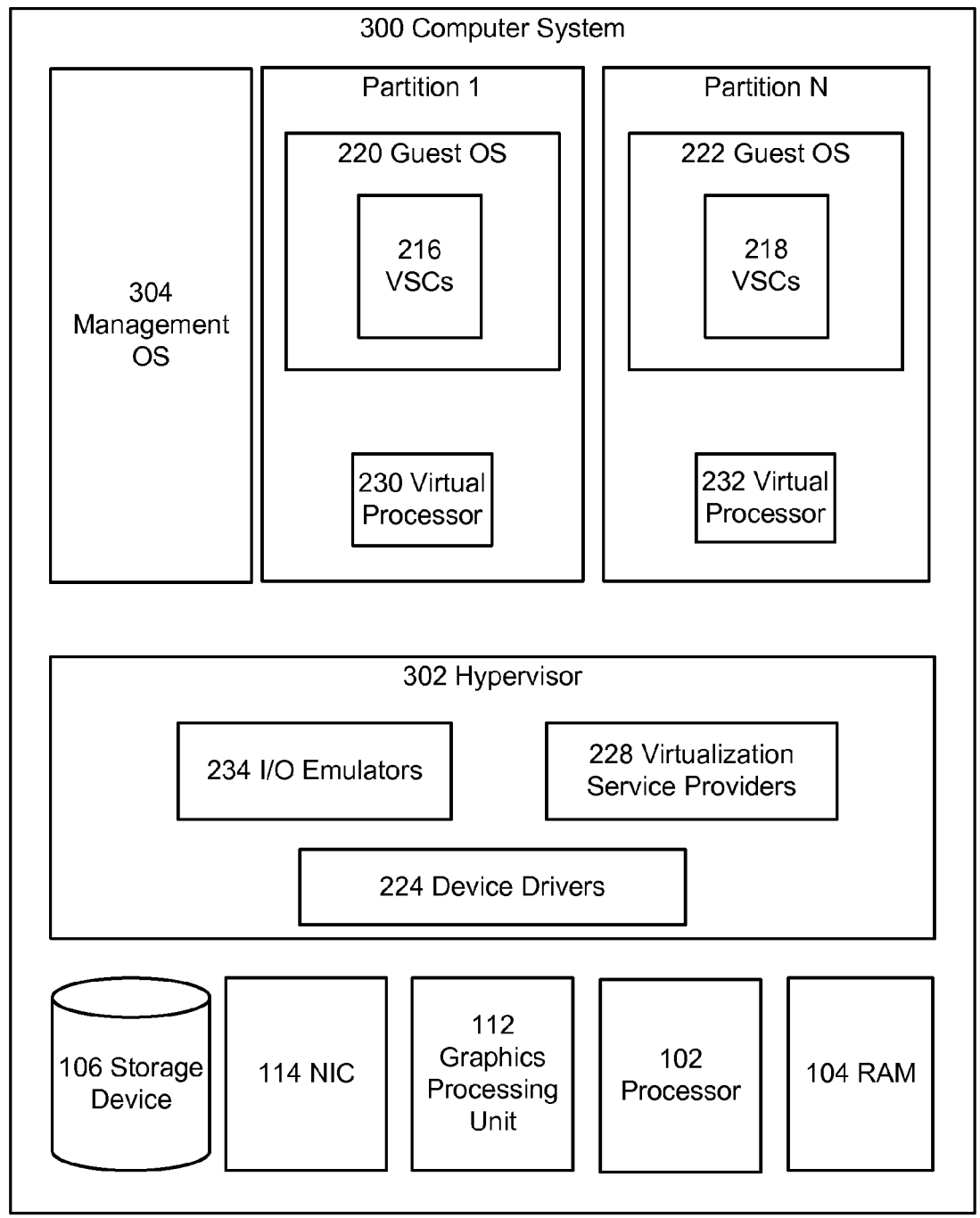
FIG. 3 depicts a high-level block diagram of a virtual machine server.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
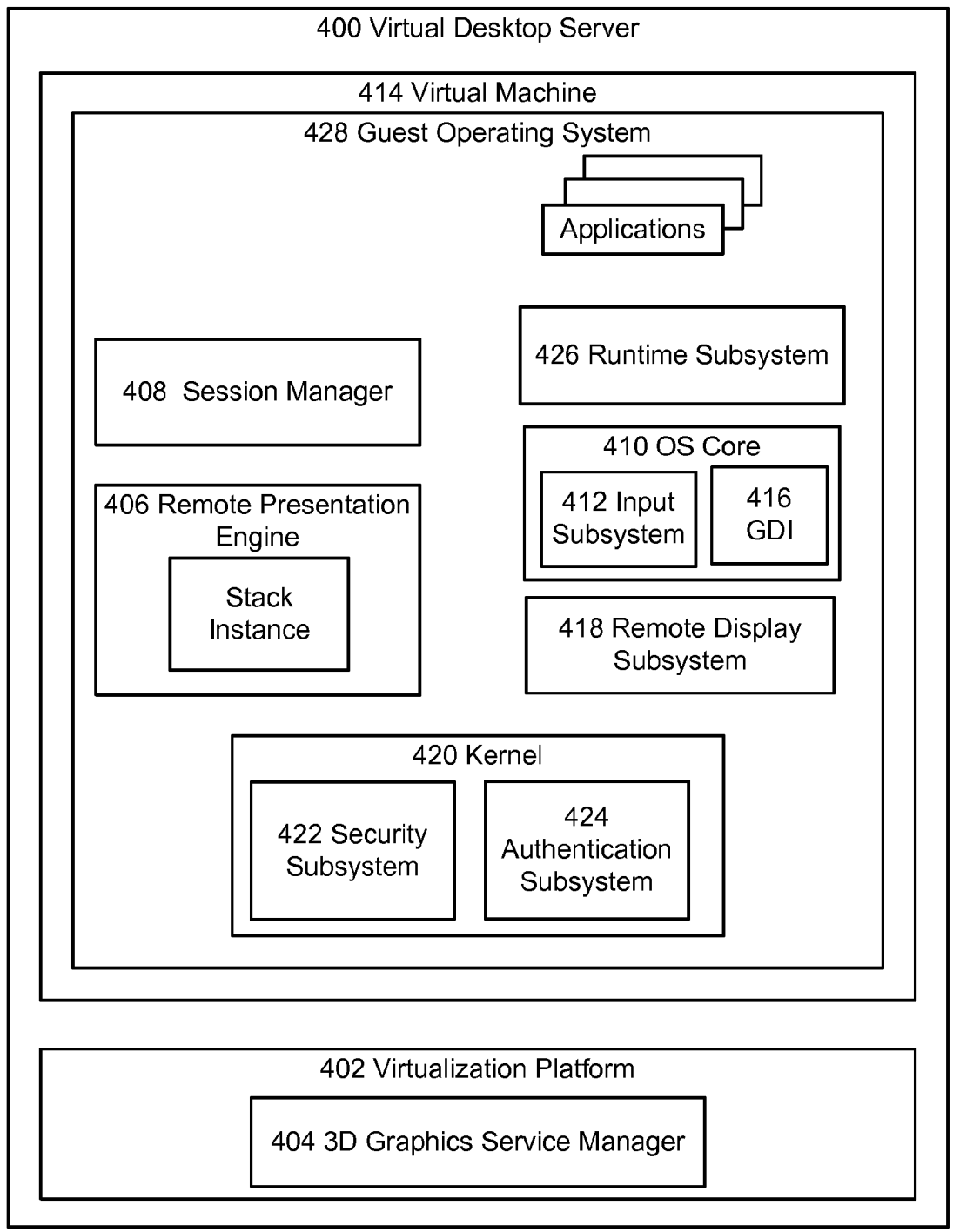
FIG. 4 depicts a high-level block diagram of a virtual desktop server

Turning now to FIG. 4, it illustrates a high-level block diagram of virtual desktop server 400. In an embodiment, virtual desktop server 400 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and the user can have total control of it, e.g., the user runs as an administrator and has full rights on the guest. In the illustrated example, virtual desktop server 400 can have components similar to computer system 200 or 300 of FIG. 2 or FIG. 3. Virtualization platform 402 is a logical abstraction of virtualization infrastructure components described above in FIG. 2 and FIG. 3. The functionality described in the following sections as "within" virtualization platform 402 can be implemented in one or more of the elements depicted in FIG. 2 or FIG. 3. For example, 3D graphics service manager 404, which is described in more detail in the following paragraphs, can be implemented in a host 204 of FIG. 2. In a more specific example, 3D graphics service manager 404 can be implemented in a host operating system running in a parent partition.

Starting a virtual desktop session requires the instantiation of a guest operating system within a virtual machine. In an exemplary embodiment, a virtual desktop manager, e.g., a module of processor executable instructions, can start up virtual machine 414 (which can boot guest operating system 428) in response to a request. The virtual desktop manager can execute on a processor and instruct virtualization platform 402, e.g., microkernel hypervisor 202, to allocate memory for a partition. Virtualization platform 402 can execute and configure virtual devices within memory of virtual machine 414 and load a boot loader program into memory allocated to VM 414. The boot loader program can execute on a virtual processor (which in turn can run on a processor) and guest operating system 428 can be loaded within virtual machine 414. Session manager 408 can be loaded by guest operating system 428 and it can load environment subsystems such as runtime subsystem 426 that can include a kernel mode part such as operating system core 410. The environment subsystems in an embodiment can be configured to expose a subset of services to application programs and provide an access point to kernel 420. When guest operating system 428 is loaded, the boot loader program can exit and turn control of virtual machine 414 over to guest operating system 428. Guest operating system 428 can execute the various modules illustrated in FIG. 4 and configure itself to host a virtual desktop session. For example, guest operating system 428 can include registry values that cause remote presentation engine 406, session manager 408, etc. to start upon boot.

At some point after guest operating system 428 is running it can receive a connection request from a client. The incoming connection request can first be handled by remote presentation engine 406, which can be configured to listen for connection messages, and when one is received it can spawn a stack instance. Remote presentation engine 406 can run a protocol stack instance for the session and a 3D graphical user interface rendered by virtualization platform 402 (described in more detail in the following paragraphs) can be received by remote display subsystem 418 and sent via the protocol stack instance to a client. Generally, the protocol stack instance can be configured to route user interface output to an associated client and route user input received from the associated client to operating system core 410. Briefly, operating system core 410 can be configured to manage screen output; collect input from keyboards, mice, and other devices.

A user credential, e.g., a username/password combination, can be received by remote presentation engine 406 and passed to session manager 408. Session manager 408 can pass the credential to a logon procedure, which can route the credential to authentication subsystem 424 for verification. Authentication subsystem 424 can determine that the user credential is valid and a virtual desktop session can be started, i.e., the user can be logged into guest operating system 428.

Authentication subsystem 424 can also generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 422. Security subsystem 422 can check the system token against an access control list associated with the object and determine whether the thread has permission based on a comparison of information in the system token and the access control list. If security subsystem 422 determines that the thread is authorized then the thread can be allowed to access the object.

Continuing with the description of FIG. 4, in an embodiment the operating system core 410 can include a graphics display interface 416 (GDI) and input subsystem 412. Input subsystem 412 in an example embodiment can be configured to receive user input from a client via the protocol stack instance for the virtual desktop session and send the input to operating system core 410. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 410 and the input subsystem 412 can be configured to determine that an icon is located at the coordinates associated with the double-click. Input subsystem 412 can then be configured to send a notification to runtime subsystem 426 that can execute a process for the application associated with the icon.

Figure 5:
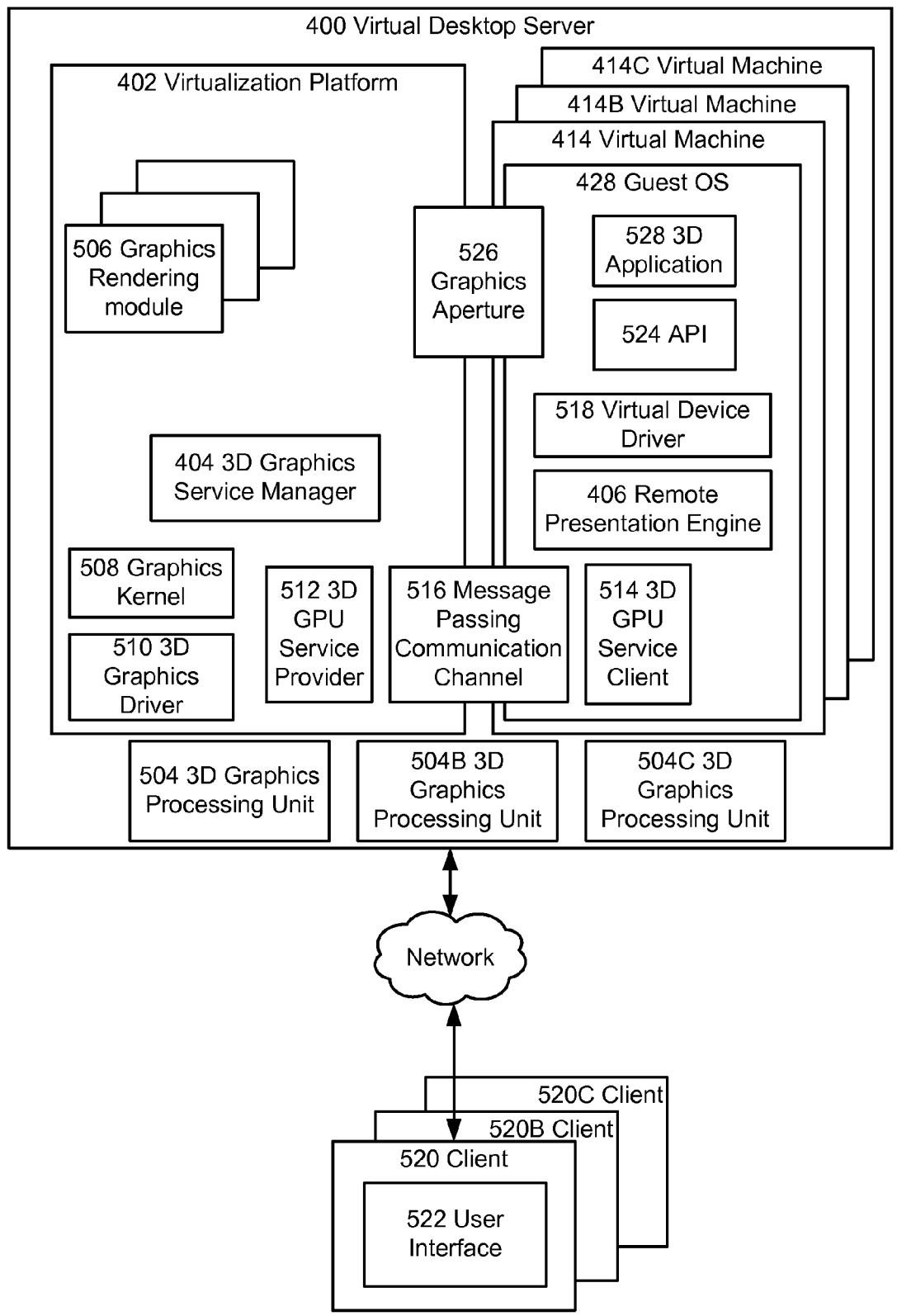
FIG. 5 depicts a high-level block diagram of a virtual desktop server.

Turning to FIG. 5, it illustrates additional components that can be used to configure virtual desktop server 400 to render 3D graphics for virtual machines (414, 414B, and/or 414C) and load balance the virtual machines on graphics processing units such as 3D GPUs 504, 504B and/or 504C. In this illustrated embodiment, virtual desktop server 400 can stream images indicative of three-dimensional graphical user interfaces to clients such as client 520, 520B, and/or 520C. Briefly, each client can be associated with a virtual machine (414, 414B, or 414C) running a guest operating system configured to conduct a virtual desktop session. Clients 520, 520B, and/or 520C can include computer system having components similar to those illustrated in FIG. 1, mobile devices, and/or thin-clients. For example, the thin-client may have commodity hardware and a monolithic web-browser configured to manage the hardware, user input and output, and connect to the Internet. In this example, the thin-client may also include user interface 522, e.g., a display and user input device such as a mouse.

Virtual desktop server 400 can be configured to render 3D graphics when it is started. For example, when virtual desktop server 400 runs, an instance of a 3D graphics service manager such as 3D graphics service manager 404 can be started. 3D graphics service manager 404, which is described in more detail in the following paragraphs, can execute on a processor and wait for incoming virtual desktop session connections. Briefly, 3D graphics service manager 404 can be configured to load balance virtual machines on graphics processing units by determining where to assign each virtual machine and by moving virtual machines based on performance information.

Prior to receiving a request to start 3D services for a virtual machine, 3D graphics service manager 404 can be configured to interrogate each graphics processing unit in the system to identify their features and store information indicative of their features in a table. The feature information can be subsequently used to balance graphics processing unit use. In an exemplary embodiment, a graphics processing unit's features can include a set of capabilities, i.e., the hardware functions, such as the ability to support surface and texture sharing or support a minimum version of a 3D graphics application program interface (API). In addition, the graphics processing unit's features can include a graphics processing unit's hardware identifier, a list of properties, and the amount of graphics random access memory (graphics RAM) the 3D graphics processing unit controls, i.e., the memory embedded within the adaptor that houses the 3D graphics processing unit. For example, graphics random access memory can be used to store the bitmap of the screen image and a Z-buffer (which manages the depth coordinates in 3D graphics), textures, vertex buffers, and compiled shader programs. In exemplary embodiments, graphics memory can be high-speed or multi-port memory, such as video RAM, dynamic random access memory, or random access memory based on double data rate (DDR) technology such as DDR2, and graphics DDR (GDDR3, GDDR4, and/or GDDR5). 3D graphics service manager 404 can be notified when a virtual desktop session connection is received; start an instance of a graphics rendering module (described in the following paragraphs in more detail) and send a signal to 3D-GPU service provider 512 to load 3D components in guest operating system 428. Briefly, 3D graphics service manager 404 can load an instance of a graphics rendering module for each virtual machine; determine which GPU for the graphics rendering module to run on; and pass graphics rendering module a device identifier for the determined graphics processing unit. The graphics rendering module can then bind to the 3D GPU and render to it on behalf of its associated virtual machine. In the illustrated example, graphics rendering module 506 corresponds to virtual machine 414. The vertex data, textures, etc., used to create the graphical user interface for virtual machine 414 can be fed from virtual machine 414 to graphics rendering module 506, which is treated by virtualization platform 402 as a process that generates a graphical user interface. Since most 3D graphics processing units are designed to simultaneously generate a few graphical user interfaces for a few processes at one time, one skilled in the art can appreciate that in the instance where a large number of graphics rendering modules are running the GPU could become easily overloaded and be reset.

Continuing with the initialization procedure, 3D-GPU service provider 512 can cause 3D graphics service client 514 to spawn in guest operating system 428. For example, memory addresses of a virtual motherboard in virtual machine 414 can have intercepts set on certain addresses that are mapped to IO devices. As guest operating system 428 starts, a plug-in-play module can execute and can query memory addresses mapped to IO. The hypervisor, e.g., hypervisor 202 of FIG. 2, can intercept the read and respond with a device identifier that causes plug-in-play module to load 3D graphics service client 514. 3D graphics service client 514 can setup a communication channel to 3D-GPU service provider 512 by mapping one or more pages of memory as shared and pass the map to 3D-GPU service provider 512. Within the pages of memory message-passing communication channel 516 can be established. Essentially, message-passing communication channel 516 is a shared region of memory that 3D GPU service provider/client can write messages to and read messages from.

3D graphics service client 514 can also cause virtual device driver 518 to spawn. Virtual device driver 518 can also establish shared graphics aperture 526 between virtual machine 414 and virtualization platform 402. In an exemplary embodiment, virtual device driver 518 can allocate a group of guest memory pages and send a signal to 3D graphics service client 514 that includes a connection request and the addresses of the memory pages. Graphics rendering module 506 can receive the connection request and the addresses of the memory pages. Graphics rendering module 506 can send a signal to the hypervisor instructing the hypervisor to create graphics aperture 526 in the group of memory pages. The hypervisor can map the pages to system physical addresses and execute graphics aperture 526 within the range of memory. In this example, virtual device driver 518 can be configured to write DMA buffers to the range of guest memory addresses. When data is written to the range of guest memory addresses, graphics aperture 526 routes the DMA buffers to graphics rendering module 506.

In an exemplary embodiment virtual device driver 518 can appear as a device driver for a 3D capable graphics processing unit to guest operating system 428, thereby causing guest operating system 428 to configure itself to support 3D graphics, e.g., by loading an instance of an application program interface 524 (API). Virtual device driver 518 can be configured to interface with API 524, which enables 3D application 528 to produce 3D graphics. 3D application 528, e.g., an operating system graphical user interface, user interface for an application/videogame, etc., can issue instructions to API 524, which can be an API such as DirectX from Microsoft®. Briefly, 3D graphics API 524 provides an abstraction layer between a graphics application, e.g., a videogame, and a driver (in this case virtual device driver 518). On one end, API 524 provides a low-level interface to graphics processing unit interfaces exposed by virtual device driver 518 and on the other, it provides a library of 3D graphics commands that can be called by applications. API 524 can map the library of 3D graphics commands to the interfaces exposed by virtual device driver 518 thus freeing game developers from having to understand the particularities of every graphics driver.

In operation, API 524 can generate primitives, e.g., the fundamental geometric shapes used in computer graphics as building blocks for other shapes represented as vertices and constants and store the vertices in a plurality direct memory access (DMA) buffers. When API 524 writes to a buffer, virtual device driver 518 can reformat the data stored in the DMA buffers; package them into one or more GPU tokens; and send the GPU tokens to graphics rendering module 506 via graphics aperture 526. Similarly, when API 524 issues a command it can be inserted into a DMA buffer and transported in a token to graphics rendering module 506.

Graphics rendering module 506 can receive the tokens; extract the DMA buffers; and store them in pages of memory associated with virtualization platform 402. In an exemplary embodiment, graphics rendering module 506 can translate the commands and the primitives in the DMA buffers into API constructs that can be processed by 3D graphics driver 510 and issue the commands to graphics kernel 508 along with the addresses of the DMA buffers in virtualization platform 402.

Graphics kernel 508, which can be configured to schedule execution on the graphics processing units within virtual desktop server 400, can receive the commands and the addresses of the DMA buffers and determine when to issue the commands to 3D graphics driver 510. When the primitives from the various DMA buffers are to be rendered, graphics kernel 508 can send draw commands to 3D graphics driver 510, which can execute on a processor and can direct graphics processing unit 504 to execute the commands and process the data in the DMA buffers.

Graphics processing unit 504 can execute and generate a bitmap, e.g., an array of pixel values, indicative of an image frame in memory. Graphics rendering module 506 can capture the bitmap and pass the bitmap to a compression module and then to remote presentation engine 406 via graphics aperture 526. Remote presentation engine 406 can sent the bitmap to client 520 via one or more packets of information.

In some instances, the stream of data sent by one or a plurality of graphics rendering modules can cause the graphics processing unit to be reset. For example, in an instance that the graphics processing unit is overloaded, i.e., the GPU has to render too many images, it can timeout and the GPU will be reset. This causes the 3D graphics driver 510 to reset, which in turn causes the graphics kernel 508 to reset connections to this GPU, which causes any graphics rendering modules bound to the GPU to terminate.

In exemplary embodiments, 3D graphics service manager 404 can be configured to balance the load on the graphics processing units within virtual desktop server 400 to reduce the chance of a reset occurring. For example, and referring to FIG. 6, it shows another high-level block diagram of virtual desktop server 400 including five virtual machines (414-414F where virtual machine 414 can be thought of as virtual machine 414A in this example). Each virtual machine can have an associated rendering process running in virtualization platform 402 (506-506F). As shown by the figure, each graphics rendering module (506-506F) can be bound, e.g., attached, to a graphics processing unit. For example, virtual machines 414, 414D, and 414E are bound to 3D GPU 504, virtual machine 414B is bound to 3D GPU 504B, and virtual machines 414C and 414F are bound to 3D GPU 504C. Each virtual machine can be moved by 3D graphics service manager 404 during runtime and the dashed line in the illustrated example shows a specific example of moving virtual machine 414 from 3D GPU 504 to 3D GPU 504B.

3D graphics service manager 404 can be configured to balance GPUs using a round-robin algorithm and/or dynamic placement algorithm. For example, a round-robin algorithm can be used to find a graphics processing unit and information to determine whether or not to assign it to render graphics from a virtual machine. If the information indicates that the graphics processing unit is overloaded, the round-robin algorithm can locate the next GPU and perform the same operation. Additionally, or alternatively, 3D graphics service manager 404 can be configured to use the information to select a graphics processing unit to render graphics from a virtual machine without serially checking each one.

In an exemplary embodiment, the information used to assign a virtual machine to a GPU, e.g., 3D GPU 504, can include an estimated amount of graphics memory available to the 3D graphics processing unit. The estimated amount of available graphics memory can be used to predict whether a GPU will timeout and connections will be reset. In this example, 3D graphics service manager 404 can be configured to use the estimated amount of available graphics memory to set a threshold. When 3D graphics service manager 404 receives a request to assign a virtual machine, 3D graphics service manager 404 can estimate the amount of graphics memory that the virtual machine will attempt to use or the amount needed to be used to at least adequately render an image for the virtual machine and compare the estimated amount to the threshold, e.g., the estimated amount of graphics memory available to the graphics processing unit, and assign the graphics rendering process to the GPU in the instance that the estimated amount of graphics memory utilized by the virtual machine is less than the threshold.

In a specific example, suppose 3D graphics processing unit 504 controls a cache of 4 gigabytes, 3D graphics service manager 404 estimates that virtual machine 414E will use 1 gigabyte of memory, a threshold is set to estimated amount of available graphics memory controlled by the GPU, the estimated amount of graphics memory utilized by virtual machine 414 is 1 gigabyte, and the estimated amount of graphics memory utilized by virtual machine 414D is 512 megabytes. In this example, 3D graphics service manager 404 can compare the estimated amount utilized for virtual machine 414E (1 gigabyte) to the estimated available amount (approximately 2.5 gigabytes) and determine that the GPU can handle the virtual machine. 3D graphics service manager 404 can assign the virtual machine to the GPU; subtract the estimated amount utilized for virtual machine 414E to obtain an estimated available amount for the GPU (approximately 1.5 gigabytes) and store the value in the table.

In an exemplary embodiment, the threshold can be set to estimated amount of available graphics memory controlled by the GPU. In another exemplary embodiment, the threshold can be set by monitoring the graphics processing units over time and determining how much available graphics memory estimated to be available when the graphics processing units reset. For example, the probability that the graphics processing unit will be reset can be calculated from performance data and correlated to an estimated amount of available graphics memory. In an example embodiment, this estimated amount of available graphics memory can be set as the threshold. In other exemplary embodiments, this estimated amount of available graphics memory can be multiplied by a scalar value and the scaled estimated amount of available graphics memory can be used as the threshold. For example, 80% of the estimated amount of available graphics memory could be set as the threshold.

In an exemplary embodiment 3D graphics service manager 404 can estimate the amount of graphics memory that a virtual machine may use based on information that includes, but is not limited to, the pixel dimensions, the color dept, the number of displays for the virtual machine, throughput, compression ratios, the estimated amount of surfaces that will be rendered for the virtual machine, the amount of memory needed to store the primitives needed to generate vertices, the memory needed to store textures to apply to the vertices, the memory needed to apply a selected anti-aliasing effect to objects, etc. 3D graphics service manager 404 can be configured to estimate the amount of graphics memory a virtual machine will use in response to receiving an indication that the virtual machine is starting. In this example, some or all of the information used to estimate the amount of graphics memory utilized can be stored in a configuration file associated with the virtual machine. In another embodiment, the estimated amount of graphics memory a virtual machine uses over runtime can be monitored, used by 3D graphics service manager 404, and stored in the configuration file for use during subsequent virtual desktop sessions.

Figure 6:
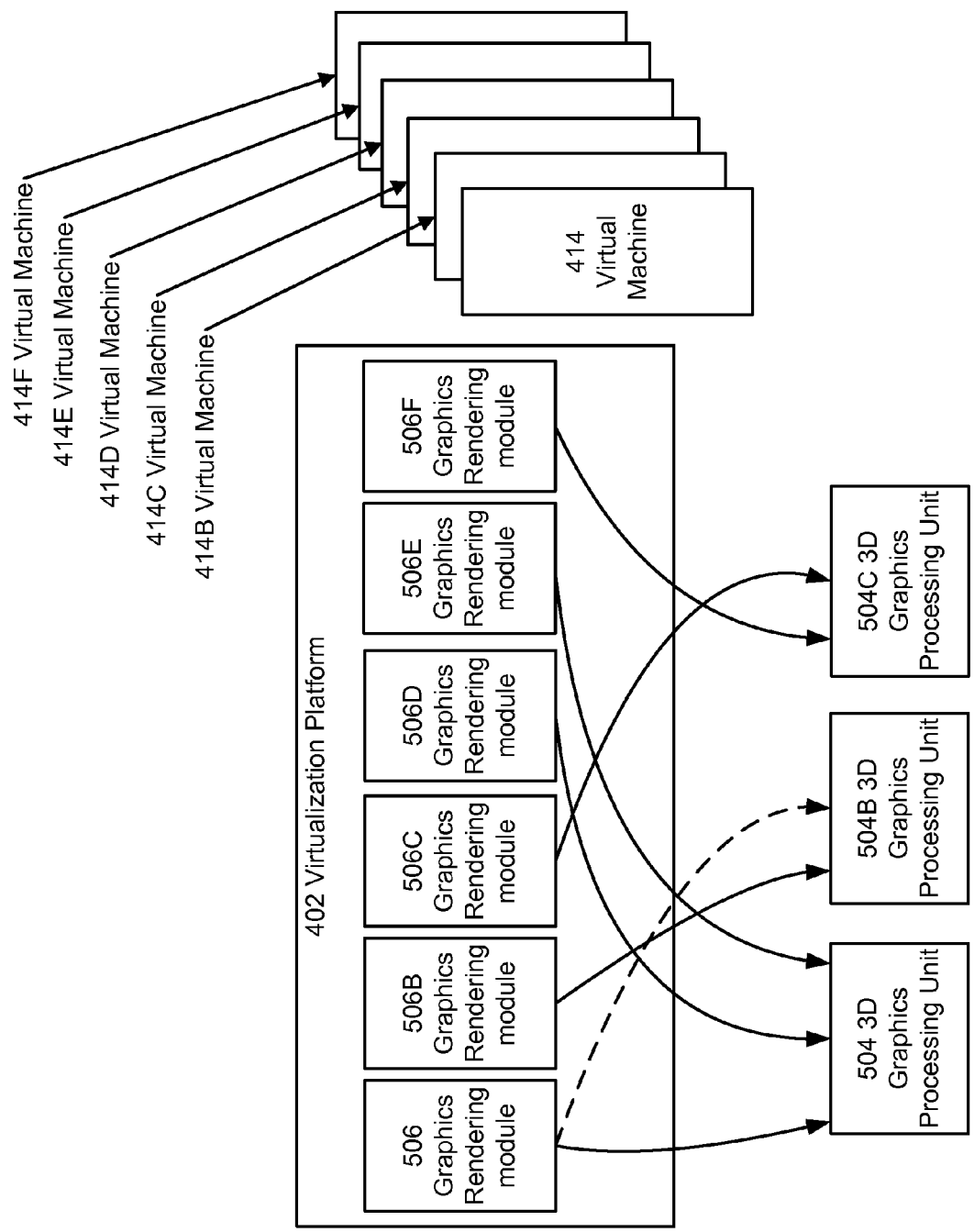
FIG. 6 depicts a high-level block diagram of a virtual desktop server.

In addition to the foregoing, in an exemplary embodiment other information can be used to assign a virtual machine to a suitable GPU. For example, the number of virtual machines already assigned to the GPU can be used to predict whether a GPU is overloaded. The number of virtual machines assigned to a GPU can be monitored over time and the number of bound virtual machines can be recorded when the graphics processing units reset. Referring to FIG. 6, 3D graphics service manager 404 could include a value in a table that reflects that 3D GPU 504 has 3 virtual machines attached, 3D GPU 504B has 1 virtual machine attached, and 3D GPU 504C has two virtual machines attached. If one of the 3D graphics processing units reset, 3D graphics service manager 404 could determine how many virtual machines were attached when it crashed from the table. The probability that the different types of graphics processing units will be reset can be calculated from performance data captured over time and correlated to an estimated amount attached virtual machines. In an exemplary embodiment where 3D graphics service manager 404 also uses the estimated amount of graphics memory to select a GPU, the estimated amount of available graphics memory can have a higher weight than the number of attached virtual machines.

In the same or another exemplary embodiment, the information used by 3D graphics service manager 404 to determine whether or not to assign a virtual machine to a GPU can include information that describes the average length of time that it takes the graphics processing unit to respond to commands, i.e., the latency, can be used to determine whether the graphics processing unit is stressed. In an embodiment 3D graphics service manager 404 can store the average latency in a table and upon crash 3D graphics service manager 404 can compare the average latency of commands to a threshold. If the average latency is less than the threshold, then 3D graphics service manager 404 can be configured to assign the virtual machine to the GPU.

The threshold can be set by an administrator or the like and can depend on the graphics processing units used. In an exemplary embodiment, experiments can be performed that load different types of GPUs with an increasing number of virtual machines. As more virtual machines are added, the latency can be recorded and the probability of a reset can be calculated by comparing the amount of resets over a time period to the amount of resets over the same time period when the latency is lower. The monitored latency associated with a high probability of a reset can be used to set the threshold. In an example embodiment, the monitored latency can be set as the threshold. In other exemplary embodiments, the monitored latency can be multiplied by a scalar value and the scaled latency can be used. For example, 80% of the monitored latency could be set as the threshold.

In an exemplary embodiment, the latency can be measured from the time that graphics kernel 508 issues a command to the GPU until an acknowledgment ("ACK") is received. After each ACK is received, graphics kernel 508 can send the latency associated with the request to 3D graphics service manager 404. 3D graphics service manager 404 can update a value in the table that reflects the average latency for the GPU.

In another example embodiment, the latency can be measured from when virtual device driver 518 starts a direct memory access transaction. For example, API 524 may write primitives to DMA buffers, which can be captured by virtual device driver 518 and sent to graphics rendering module 506. API 524 can eventually issue a command. When virtual device driver 518 receives the command it can start a timer. Virtual device driver 518 can send the command to graphics rendering module 506, which in turn can send a command to graphics kernel 508. Graphics kernel 508 can send the command to 3D graphics driver 510, which can cause 3D graphics processing unit 504 to process the primitives in the DMA buffers. 3D GPU 504 can generate an ACK and it can be propagated back to virtual device driver 518 and virtual device driver 518 can stop the timer. Virtual device driver 518 can then send the latency to 3D graphics service manager 404 via message-passing communication channel 516. 3D graphics service manager 404 can update a value in the table that reflects he average latency for the virtual machine.

For example, virtual device driver 518 can send a message to 3D graphics service client 514 that includes the latency for the transaction. 3D GPU service provider 512 can receive the message and send the message to 3D graphics service manager 404, which can update a table. In this example, the latency for the transaction can be used to determine an average latency for DMA transactions issued by virtual machine 414, which reflect whether the resources of 3D GPU 504 are overcommitted.

In addition to load balancing virtual machines as they are spawned, in exemplary embodiments 3D graphics service manager 404 can be configured to move virtual machines from one 3D GPU to another (by rebinding its associated graphics rendering module) in response to current conditions. For example, FIG. 6 illustrates graphics rendering module 506 being moved from 3D GPU 504 to 3D GPU 504B. In this exemplary embodiment, the 3D graphics service manager 404 can run when a context switch occurs to run virtualization platform 402, when a request to start a virtual machine is detected, and/or after a predetermined amount of time expires and an interrupt is generated.

In this exemplary embodiment, 3D graphics service manager 404 can be configured to determine whether any GPUs are overloaded, e.g., are at risk of resetting, and move virtual machines (in the instance that a migration operation would reduce the risk that the overloaded GPU and would not unacceptably increase the risk of causing the other GPUs to reset). For example 3D graphics service manager 404 can be configured to determine the number of virtual machines bound to each 3D GPU, the amount of graphics memory available for each 3D GPU, the average latency for DMA transactions initiated by each virtual machine bound to each 3D GPU, the percentage each graphics rendering module uses a 3D GPU, the throughput associated with each graphics rendering module, and/or the average latency of graphics kernel commands. In the instance that this information indicates that a 3D GPU is overloaded, 3D graphics service manager 404 can be configured to identify which virtual machine is under the most stress. 3D graphics service manager 404 can then assign the stressed virtual machine to another graphics processing unit. The assignment part of the operational procedure is similar to the assignment process described above.

In an exemplary embodiment, 3D graphics service manager 404 can initiate a move operation by sending a move command along with the device identifier for the new GPU to the graphics rendering module, e.g., graphics rendering module 506. In this example, graphics rendering module 506 can receive the command and find the GPU associated with the new identifier, e.g., 3D GPU 504B. In this example, graphics rendering module can be configured to copy any internal buffers; bind to 3D GPU 504B and tear down the mapping to 3D GPU 504. After the bind operation is completed, the graphics rendering module can inform 3D graphics service manager 404 that the move occurred and 3D graphics service manager 404 can update its table to reflect that graphics rendering module 506 is attached to 3D GPU 504B.

Figure 7:
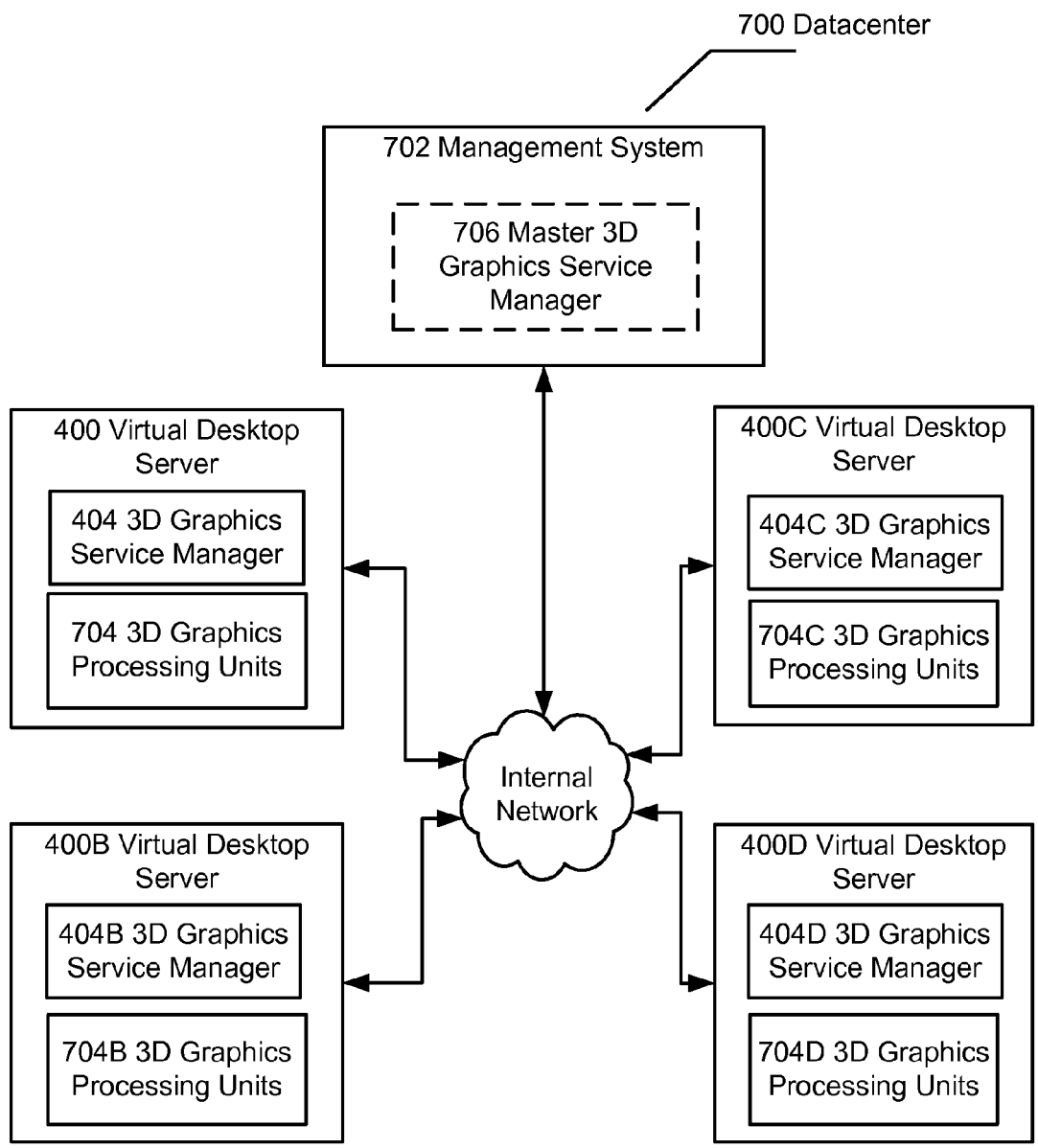
FIG. 7 illustrates a high-level block diagram of a datacenter.

Referring to FIG. 7, in an exemplary embodiment, a move operation can be used to migrate a virtual machine to a different virtual desktop server (400B-400D). As shown by the figure, each virtual desktop server (400-400D) can include a set of one or more graphics processing units (704-704D) and an instance of 3D graphics service manager (404-404D). Also shown is a management system 702 that can be configured to control the datacenter 700. Management system 702 can optionally include master 3D graphics service manager 706 (indicated in dashed lines to denote that it is considered optional) that can control all the other 3D graphics service managers (404-404D) in datacenter 700.

Unique information identifying each virtual machine can be used to effect a migration operation. For example, when each virtual machine is started, a 3D graphics service manager running on the server where the VM starts, e.g., 3D graphics service manager 404 can create a unique identifier for the virtual machine within datacenter 700. The unique identifier can include the type of graphics processing unit the virtual machine is rendering on, the estimated amount of graphics memory it uses, etc. In an example embodiment, if virtual machine 414 is stressed and no suitable GPU is available on the server, 3D graphics service manager 404 can send the unique identifier to each virtual desktop server within the datacenter or optionally to management system 702.

In the example where the unique identifier is sent to each virtual desktop server, the graphics service managers (404-404D) can determine whether or not the virtual machine can be assigned to a graphics processing unit based on the information described in the preceding paragraphs. In the instance that a graphics service manager, e.g., graphics service manager 404C determines that it can handle virtual machine 414, virtual desktop server 400 can be configured to migrate virtual machine 414 to virtual desktop server 400C.

In the example where the unique identifier is sent to master 3D graphics service manager 706, master 3D graphics service manager 706 can be configured to include all the performance information from each 3D graphics service manager (404-404D) within datacenter 700; and master 3D graphics service manager 706 can determine whether or not the virtual machine can be assigned to any graphics processing unit within datacenter 700 based on the information described in the preceding paragraphs.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 8:
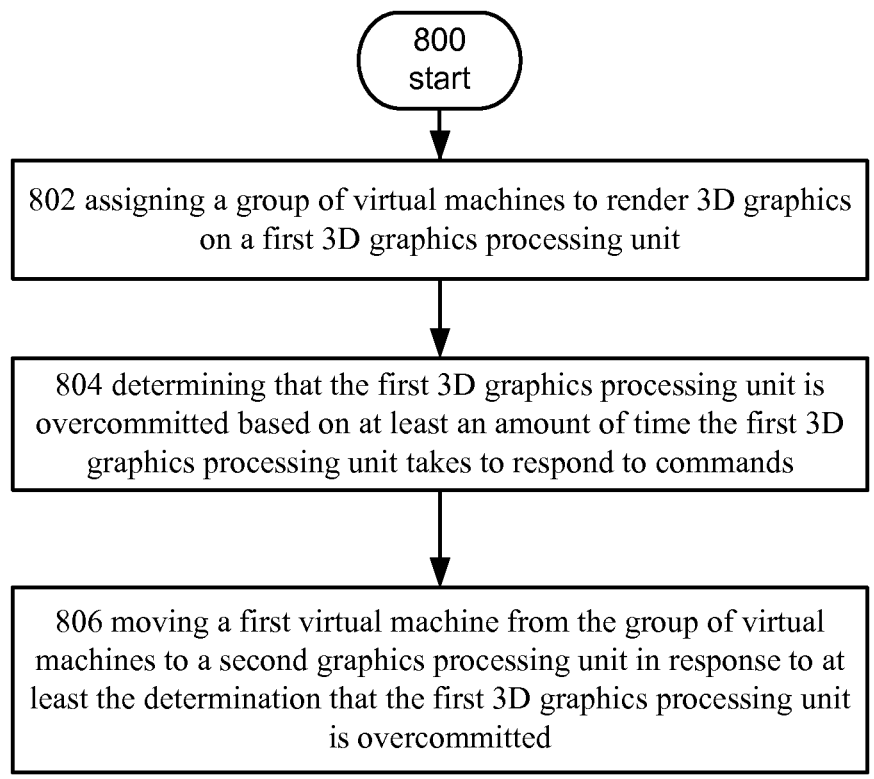
FIG. 8 depicts an operational procedure for balancing GPU use among virtual machine.

Referring to FIG. 8, it shows an operational procedure for balancing graphics processor use among virtual machines including operations 800, 802, 804, and 806. Operation 800 indicates the beginning of the operational procedure, and operation 802 shows assigning a group of virtual machines to render 3D graphics on a first 3D graphics processing unit. For example, and referring to FIG. 6, in an exemplary embodiment 3D graphics service manager 404 can assign a group of virtual machines to render on a graphics processing unit, e.g., virtual machine 414, virtual machine 414D, and virtual machine 414E to render 3D graphics on 3D graphics processing unit 504. In this specific example, each virtual machine (414-414F) can be associated with a graphics rendering module (506, 506D, and 506E) that execute in virtualization platform 402, e.g., within a host 204 of FIG. 2, that can be bound to 3D graphics processing unit 504 via application program interface calls. Graphics rendering modules (506, 506D, and 506E) in this example can be configured to collect the DMA buffers containing primitives and API constructs indicative of commands; optionally translate the commands into commands that can be handled by 3D graphics driver 510; and issue the commands to graphics kernel 508 along with the pages of memory containing the DMA buffers.

Continuing with the description of FIG. 8, operation 804 shows determining that the first 3D graphics processing unit is overcommitted based on at least an amount of time the first 3D graphics processing unit takes to respond to commands. For example, in an exemplary embodiment 3D graphics service manager 404 can execute on a processor and determine that 3D graphics processing unit 504 is overcommitted, e.g., 3D graphics processing unit 504 does not have enough resources to service all its requests and could be reset thereby causing graphics rendering modules (506, 506D, and 506E) to terminate. In this specific example, the determination can be based on at least the average length of time that it takes for the graphics processing unit, e.g. 3D GPU 504, to reply to graphics kernel 508 with an ACK. In this example, a table controlled by 3D graphics service manager 404 can be updated with the latency it takes the hardware to respond to graphics kernel commands and an average can be calculated for 3D GPU 504. The average can be compared to a threshold latency value and if the average is greater than the threshold 3D graphics service manager 404 can be configured to determine that 3D GPU 504 is overcommitted.

Continuing with the description of FIG. 8, operation 806 shows moving a first virtual machine from the group of virtual machines to a second graphics processing unit in response to at least the determination that the first 3D graphics processing unit is overcommitted. For example, and referring again to FIG. 6, in an exemplary embodiment 3D graphics service manager 404 can be configured to select a first virtual machine, e.g., virtual machine 414, to move to a second graphics processing unit, e.g., 3D GPU 504B. In an example, moving virtual machine 414 to 3D GPU 504B involves moving graphics rendering module 506 from 3D GPU 504 to 3D GPU 504B. For example, 3D graphics service manager 404 can send a move command to graphics rendering module 506 along with the device identifier for 3D GPU 504B. Graphics rendering module 506 can receive the command; copy internal buffers; and bind to 3D GPU 504B. After the bind operation is complete graphics rendering module 506 can tear down the mapping to 3D GPU 504 and send a completion signal to 3D graphics service manager 404, which can update the table to reflect that virtual machine 414 is bound to 3D GPU 504B. Going forward, graphics rendering module 506 can issue render commands to 3D GPU 504B and the average latency of commands can be monitored by 3D graphics service manager 404.

Figure 9:
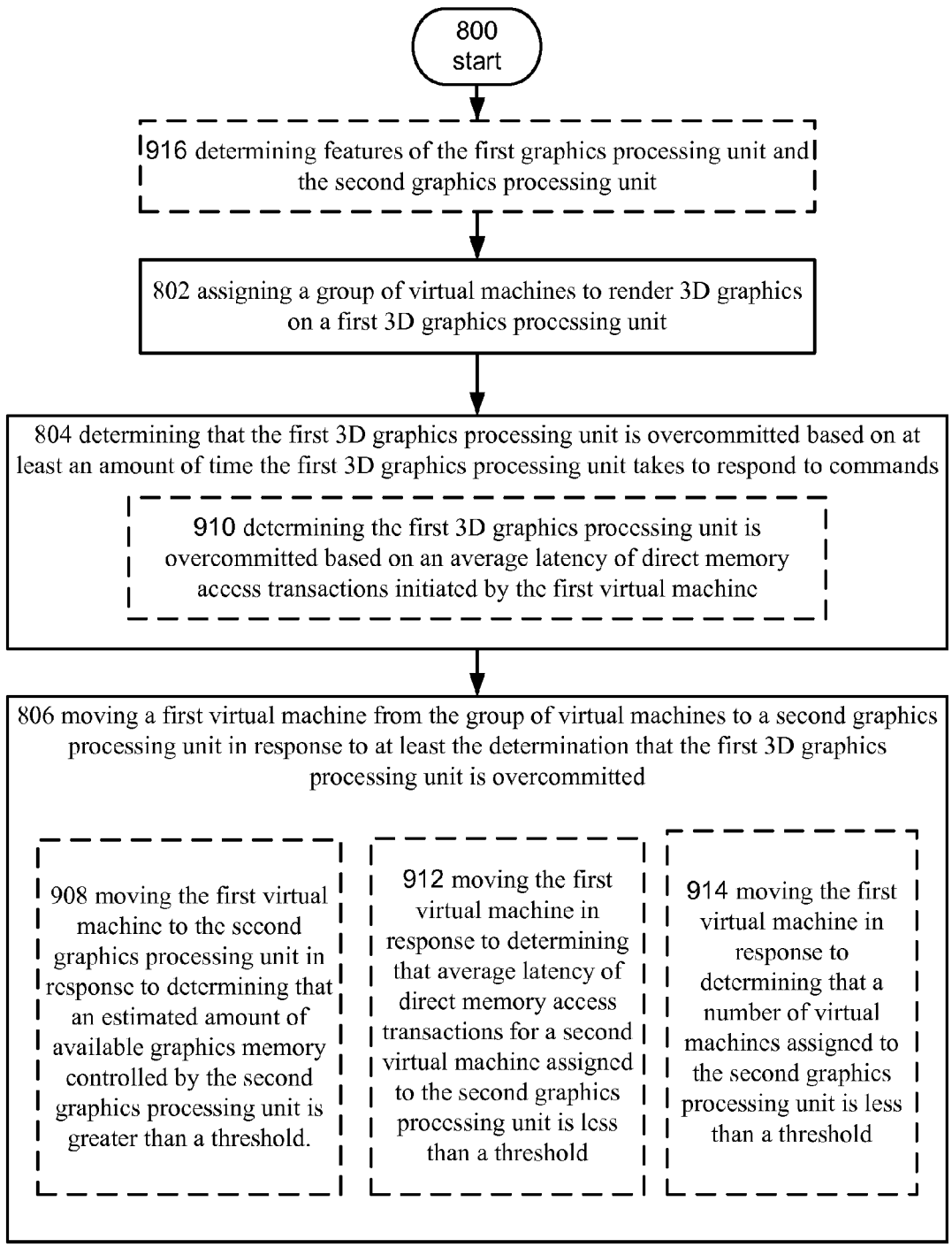
FIG. 9 illustrates the operational procedure of FIG. 8 including additional operations.

Turning now to FIG. 9, it illustrates the operational procedure of FIG. 8 including the additional operations/refinements 908-916. Operation 908 shows moving the first virtual machine to the second graphics processing unit in response to determining that an estimated amount of available graphics memory controlled by the second graphics processing unit is greater than a threshold. For example, and referring to FIG. 6, in an exemplary embodiment 3D graphics service manager 404 can be configured to select a virtual machine that is bound to 3D GPU 504 to move, e.g., virtual machine 414. In this example, the decision to move virtual machine 414 to 3D GPU 504B can be based at least upon a determination that the estimated amount of graphics memory available to 3D GPU 504B is greater than a threshold, which could be based on the estimated amount of graphics memory utilized to render graphics for virtual machine 414. In this case, 3D graphics service manager 404 can be configured to move virtual machine 414 in response to a determination that 3D GPU 504 is overloaded and a determination that 3D GPU 504B can accommodate virtual machine 414.

Continuing with the description of FIG. 9, operation 910 shows determining the first 3D graphics processing unit is overcommitted based on an average latency of direct memory access transactions initiated by the first virtual machine. In this example, 3D graphics service manager 404 can move virtual machine 414 because the average latency of DMA transactions associated with virtual machine 414 is greater than, for example, all the other graphics rendering modules (506D and 506E) bound to 3D GPU 504. In this example, 3D graphics service manager 404 can be configured to first determine the average latency of commands issued by graphics kernel 508 and then use the average latency of DMA transactions to determine that virtual machine 414 is the heaviest loaded virtual machine associated with the GPU.

Turning to operation 912, it shows moving the first virtual machine in response to determining that average latency of direct memory access transactions for a second virtual machine assigned to the second graphics processing unit is less than a threshold. In an exemplary embodiment 3D graphics service manager 404 can be configured to determine to move virtual machine 414 to 3D GPU 504B in response to determining that the average latency of DMA transactions for one or more virtual machines bound to 3D GPU 504B is less than the threshold. For example 3D graphics service manager 404 can check a table that includes the average latency of DMA transactions for virtual machine 414B. 3D graphics service manager 404 can compare the average latency to a threshold and determine that the average latency is less than the threshold. This indicates that the load within virtual machine 414B is low and inferentially indicates that the load on 3D GPU 504B is low. In this case, 3D graphics service manager 404 can be configured to move graphics rendering module 506 based on at least this determination.

Turning to operation 914, it shows moving the first virtual machine in response to determining that a number of virtual machines assigned to the second graphics processing unit is less than a threshold. In an exemplary embodiment 3D graphics service manager 404 can be configured to determine to move virtual machine 414 to 3D GPU 504B in response to determining that the number of virtual machines bound to 3D GPU 504B is less than a threshold number. In this example, 3D graphics service manager 404 can be configured to read a value from its table that indicates the number of virtual machines currently bound to 3D GPU 504B (which is one in the illustrated example) and determine the number of currently bound virtual machines is less than a threshold number, i.e. a number based on performance data and/or admin preference. In this case, 3D graphics service manager 404 can be configured to move graphics rendering module 506 based on at least this determination.

Turning to operation 916, it shows determining features of the first graphics processing unit and the second graphics processing unit. For example, in an embodiment 3D graphics service manager 404 can be configured to determine the features of each 3D graphics processing unit in the computer system. For example, and continuing with the previous example, 3D graphics service manager 404 can be configured to determine the features of 3D graphics processing unit 504, 504B, and 504C. In this example, the features can be used to determine whether the graphics processing units can handle 3D graphics for virtual machines. For example, 3D graphics service manager 404 can be configured to check to see if the graphics cards support shared surfaces and textures, whether it supports at least a certain version of, for example DirectX®, the amount of graphics memory associated with the graphics processing units, etc. In this example, the information can be used to populate a table that can be used to balance graphics processing unit use among virtual machines.

Figure 10:
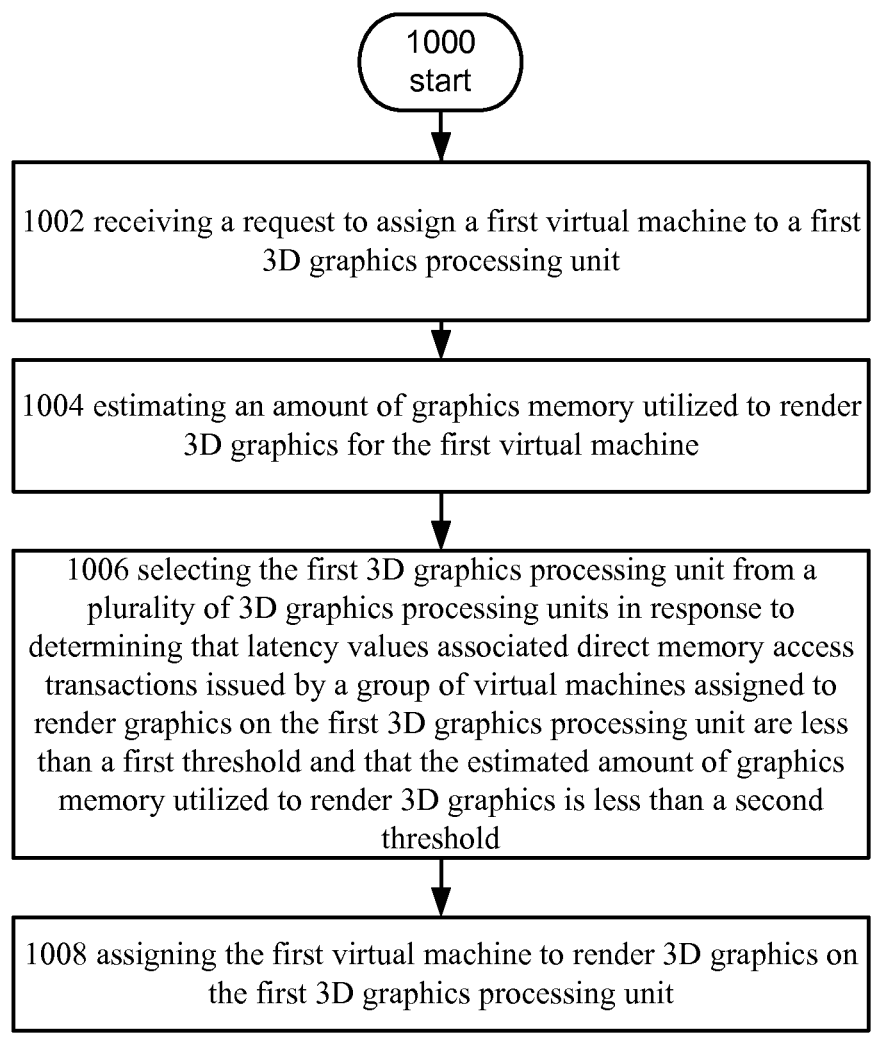
FIG. 10 depicts an operational procedure for balancing GPU use among virtual machine.

Referring now to FIG. 10, it shows an operational procedure for balancing graphics processing unit use among virtual machines including operations 1000, 1002, 1004, 1006, and 1008. Turning to operation 1000, it begins the operational procedure and operation 1002 shows receiving a request to assign a first virtual machine to a first 3D graphics processing unit. For example, and referring to FIG. 5, in an exemplary embodiment 3D graphics service manager 404 can execute and receive a request to assign a first virtual machine, e.g., virtual machine 414, to a 3D graphics processing unit, e.g., 3D GPU 504. The request in this example could be a signal indicating that a client such as client 520 has requested a virtual desktop session.

Continuing with the description of FIG. 10, operation 1004 shows estimating an amount of graphics memory utilized to render 3D graphics for the first virtual machine. For example, in an embodiment 3D graphics service manager 404 can estimate the amount of graphics memory that virtual machine 414 can utilize to render 3D graphics, e.g., an amount of graphics memory that would allow for at least adequate rendering of graphics for the virtual machine. For example, the estimate can be based on information obtained from a configuration file associated with virtual machine 414 that indicates, for example, the average amount of graphics memory virtual machine 414 used during the last time it was running. In another exemplary embodiment, the estimated amount of graphics memory needed to render graphics for a virtual machine can be estimated from information that describes the minimum amount of memory that is needed to display an image. In another example embodiment, the estimated amount of graphics memory can be based an estimated amount of memory needed to cache primitives, etc.

Operation 1006 shows selecting the first 3D graphics processing unit from a plurality of 3D graphics processing units in response to determining that latency values associated direct memory access transactions issued by a group of virtual machines assigned to render graphics on the first 3D graphics processing unit are less than a first threshold and that the estimated amount of graphics memory utilized to render 3D graphics is less than a second threshold. For example, 3D graphics service manager 404 can store information that indicates a latency value for DMA transactions for each virtual machine bound to 3D GPU 504. For example, virtual machines 414D and 414E may be bound to 3D GPU 504 when 3D graphics service manager 404 receives a request to assign virtual machine 414 to a 3D GPU. In this example, 3D graphics service manager 404 can obtain latency values from the table and compare the latency values to a threshold value. In this example, 3D graphic service manager 404 can also compare the estimated amount of graphics memory utilized to render 3D graphics for virtual machine 414 to a threshold. In the instant that the average latency for virtual machines 414D and 414E are less than the threshold and the estimated amount of graphics memory utilized to render 3D graphics for virtual machine 414 is less than a second threshold, 3D graphics service manager 404 can select 3D GPU 504.

In an exemplary embodiment, the second threshold, i.e., the threshold associated with the estimated amount of graphics memory utilized to render 3D graphics, can be based on the total amount of graphics memory controlled by 3D GPU 504 and the estimated amount of graphics memory utilized to render 3D graphics for virtual machines 414D and 414E. For example, when virtual machines 414D and 414E started 3D graphics service manager 404 could have calculated the estimated amount of graphics memory utilized to render 3D graphics for virtual machines 414D and 414E and stored the values in a table. When 3D graphics service manager 404 selected 3D GPU 504 for each of virtual machines 414D and 414E 3D graphics service manager 404 could have subtracted their associated estimated amount of graphics memory utilized to render 3D graphics from the estimated amount of available graphics memory controlled by GPU 504 and stored the value in the table. This value could then be used as the second threshold or the second threshold can be based at least in part on this value.

Operation 1008 shows assigning the first virtual machine to render 3D graphics on the first 3D graphics processing unit. For example, and referring again to FIG. 6, in an exemplary embodiment 3D graphics service manager 404 can be configured to instantiate graphics rendering module 506 and send it a command to bind to 3D graphics processing unit 504. Graphics rendering module 506 can receive the command and bind to 3D graphics processing unit 504. After graphics rendering module 504 binds to 3D graphics processing unit 504 and a communication channel is established between virtual machine 414 and graphics rendering module 506, graphics rendering module 506 can receive DMA buffers of vertices and render them on 3D graphics processing unit 504.

Figure 11:
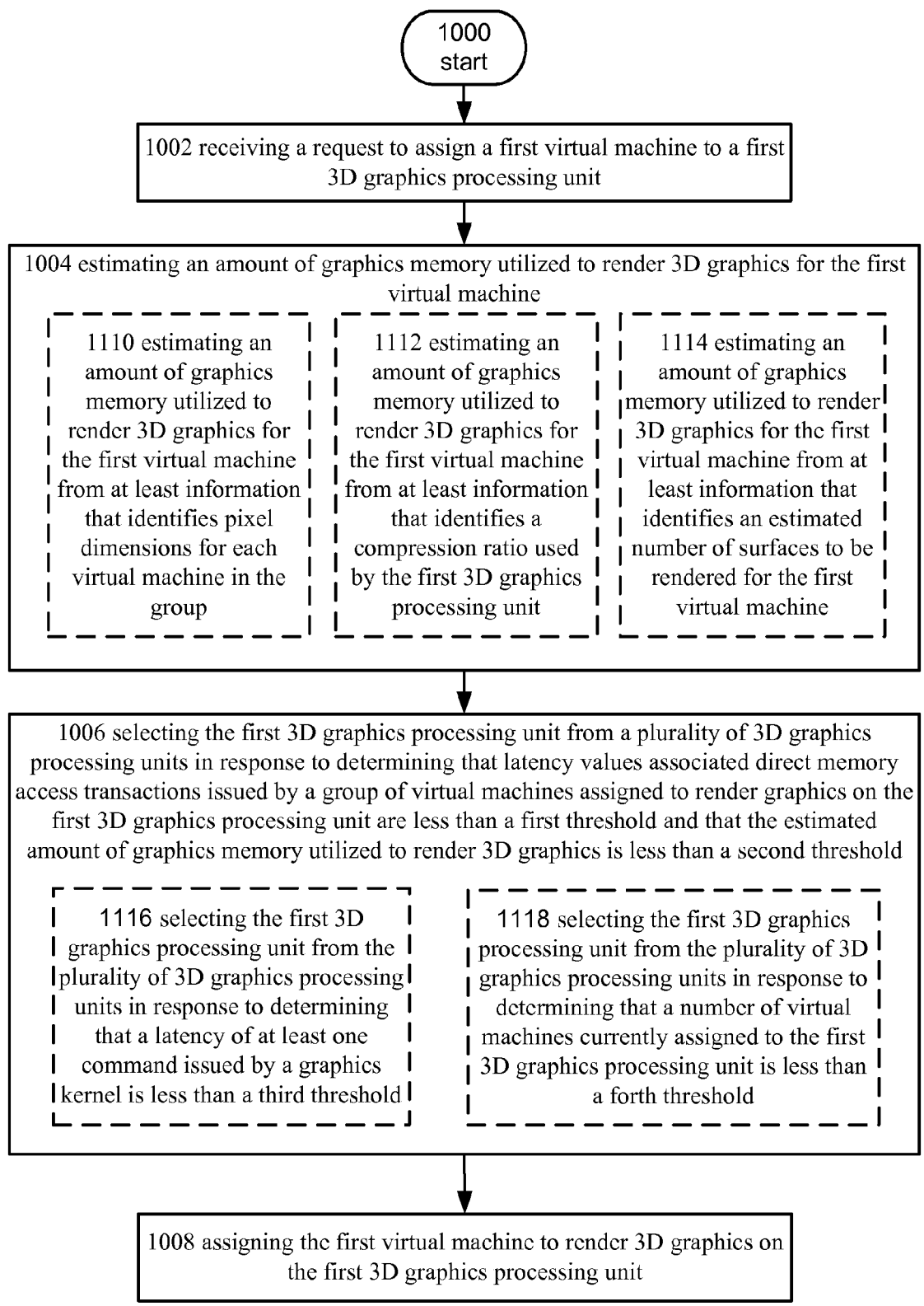
FIG. 11 illustrates the operational procedure of FIG. 10 including additional operations.

Turning to FIG. 11, it illustrates the operational procedure of FIG. 11 including the additional operations 1110-1118. Operation 1110 shows estimating an amount of graphics memory utilized to render 3D graphics for the first virtual machine from at least information that identifies pixel dimensions for each virtual machine in the group. For example, in an embodiment the amount of graphics memory utilized to render 3D graphics for each virtual machine can be based on the pixel dimensions associated with the virtual machine. For example, when a virtual machine is instantiated a configuration file can be received that includes information such as the desired display resolution for the virtual machine. 3D graphics service manager 404 can receive this information and use it to estimate the amount of graphics memory utilized to render 3D graphics for this virtual machine.

For example, pixel dimensions describe the number of distinct pixels in each dimension that can be displayed by a monitor. Since the monitor is a two-dimensional surface, the dimensions only two dimensions are used (height and width). In an exemplary embodiment, pixel dimensions can be multiplied by pixel depth and divided by 8. The result describes the amount of graphics memory that can be utilized to render an image at the desired display resolution.

Continuing with the description of FIG. 11, operation 1112 shows estimating an amount of graphics memory utilized to render 3D graphics for the first virtual machine from at least information that identifies a compression ratio used by the first 3D graphics processing unit. For example, in an embodiment the compression ratio, i.e., the ratio between the size of a compressed image and the uncompressed image, can be used to estimate how much graphics memory a virtual machine will use to adequately render images for the virtual machine. For example, the 3D graphics processing units can be configured to use compressed textures to reduce their size. When 3D graphics service manager 404 interrogates the hardware, it can determine whether or not texture compression can be enabled and what compression ratio will be achieved. 3D graphics service manager 404 can use this information to estimate the amount of graphics memory that the virtual machine will use.

Referring to operation 1114 it depicts estimating an amount of graphics memory utilized to render 3D graphics for the first virtual machine from at least information that identifies an estimated number of surfaces to be rendered for the first virtual machine. For example, in an embodiment the estimated number of surfaces that the virtual machine will attempt to render can be used to estimate the amount of graphics memory the virtual machine will use to adequately render 3D graphics for the virtual machine.

Turning to operation 1116, it depicts selecting the first 3D graphics processing unit from the plurality of 3D graphics processing units in response to determining that a latency of at least one command issued by a graphics kernel is less than a third threshold. For example, and referring back to FIG. 6, in an exemplary embodiment 3D graphics service manager 404 can execute on a processor and determine to assign virtual machine 414 to render on 3D graphics processing unit 504 in response to at least determining that the length of time that it takes for the graphics processing unit, e.g. 3D GPU 504, to reply to at least one command issued by graphics kernel 508 with an ACK is less than a threshold value. In this example, a table controlled by 3D graphics service manager 404 can be updated with the latency it takes the hardware to respond to graphics kernel commands and in an example embodiment the latency can be used, or an average can be calculated for 3D GPU 504. In the example where the average is used, the average can be compared to a threshold latency value and if the average is greater than the threshold 3D graphics service manager 404 can be configured to determine that 3D GPU 504 is overcommitted.

Referring now to operation 1118 it shows selecting the first 3D graphics processing unit from the plurality of 3D graphics processing units in response to determining that a number of virtual machines currently assigned to the first 3D graphics processing unit is less than a forth threshold. 3D graphics service manager 404 can be configured to determine to select 3D graphics processing unit 504 to render graphics for virtual machine 414 in response to determining that the number of virtual machines bound to 3D graphics processing unit 504 is less than a threshold number. In this example, 3D graphics service manager 404 can be configured to read a value from its table that indicates the number of virtual machines currently bound to 3D graphics processing unit 504 (which is two in the illustrated example) and determine the number of currently bound virtual machines is less than a threshold number, i.e. a number based on performance data and/or admin preference.

Figure 12:
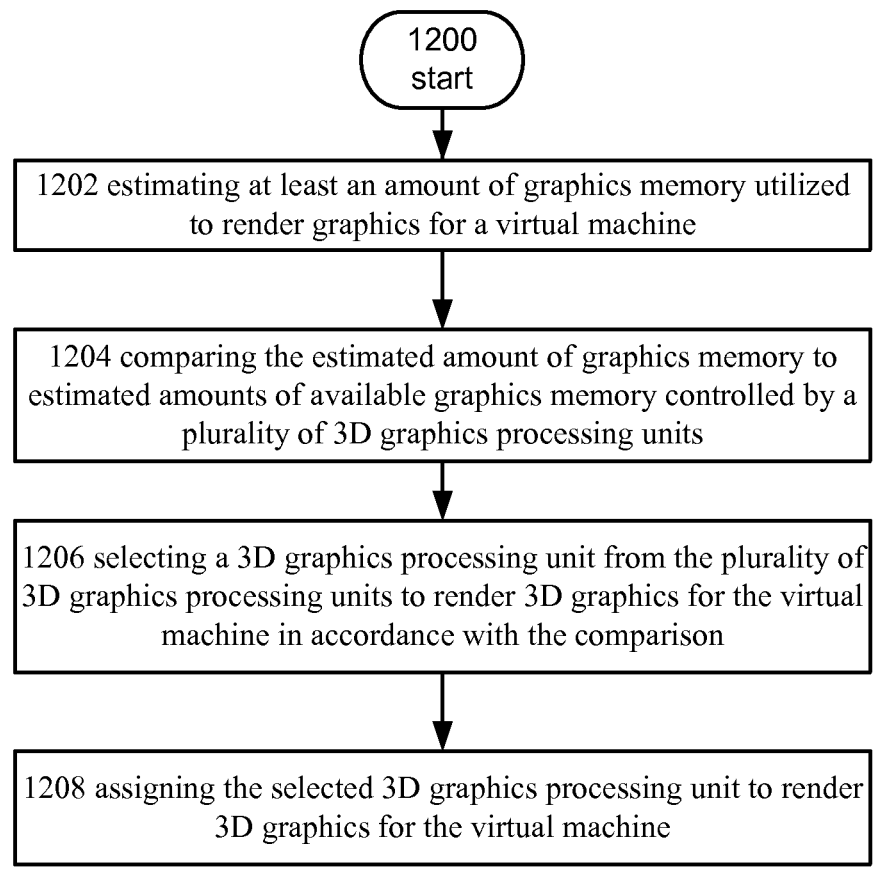
FIG. 12 depicts an operational procedure for balancing GPU use among virtual machine.

Referring now to FIG. 12, it shows an operational procedure including operations 1200, 1202, 1204, 1206, and 1208. Operation 1200 begins the operational procedure and operation 1202 shows estimating at least an amount of graphics memory utilized to render graphics for a virtual machine. For example, in an embodiment 3D graphics service manager 404 can receive an indication that a virtual machine, e.g., virtual machine 414, is being instantiated and 3D graphics service manager 404 can begin an operational procedure to select a graphics processing unit to run on, e.g., 3D graphics processing unit 504. In this example the operational procedure can include estimating the amount of graphics memory that will be used to adequately render graphics for virtual machine 414. For example, the estimated amount of graphics memory can be used as an indicator of how memory intensive the virtual machine will be over its runtime.

The aforementioned estimation of amount of graphics memory utilized can be based on the minimum amount of memory that is needed to display an image. In another example embodiment, the estimated amount of graphics memory can be based an estimated amount of memory needed to store primitives needed to generate vertices, textures to apply to the vertices, what color the vertices should be, memory to apply anti-aliasing techniques to objects, etc. In an example, this estimate could be static, i.e., set by an administrator based on expected use or it could be dynamic. For example, the amount of graphics memory a virtual machine 414 uses or attempts to use can be monitored overtime, i.e. across virtual desktop sessions, and the estimate can be used to refine the estimate.

Turning now to operation 1204, it depicts comparing the estimated amount of graphics memory to estimated amounts of available graphics memory controlled by a plurality of 3D graphics processing units. For example, 3D graphics service manager 404 can be configured to compare the estimated amount of graphics memory that will be utilized by virtual machine 414 to an estimated amount of graphics memory available for each graphics processing unit attached to virtual desktop server 400. In this example, 3D graphics service manager 404 could have previously obtained the amount of graphics memory integrated within the graphics cards that house the graphics processing units and stored the information in a table. In addition, each time a virtual machine is bound to a graphics processing unit, 3D graphics service manager 404 can be configured to subtract the estimated amount of graphics memory that the virtual machine will use from the total number and store that value in the table. Here, 3D graphics service manager 404 can compare the estimated amount of graphics memory needed by virtual machine 414 to the estimated amount of available graphics memory on 3D GPU 504, 3D GPU 504B, and 3D GPU 504C.

Continuing with the description of FIG. 12, operation 1206 shows selecting a 3D graphics processing unit from the plurality of 3D graphics processing units to render 3D graphics for the virtual machine in accordance with the comparison. For example, 3D graphics service manager 404 can select a GPU to bind the virtual machine to based on at least the results of the comparison, e.g., 3D GPU 506. For example, and continuing with the previous example, 3D graphics service manager 404 can determine that 3D GPU 504 can host virtual machine 414 based at least in part on the fact that 3D GPU 504 is estimated to have enough graphics memory.

Turning now to operation 1208, it shows assigning the selected 3D graphics processing unit to render 3D graphics for the virtual machine. For example, and referring again to FIG. 6, in an exemplary embodiment 3D graphics service manager 404 can be configured to instantiate graphics rendering module 506 and send it a command to bind to 3D graphics processing unit 504. Graphics rendering module 506 can receive the command and bind to 3D graphics processing unit 504.

Figure 13:
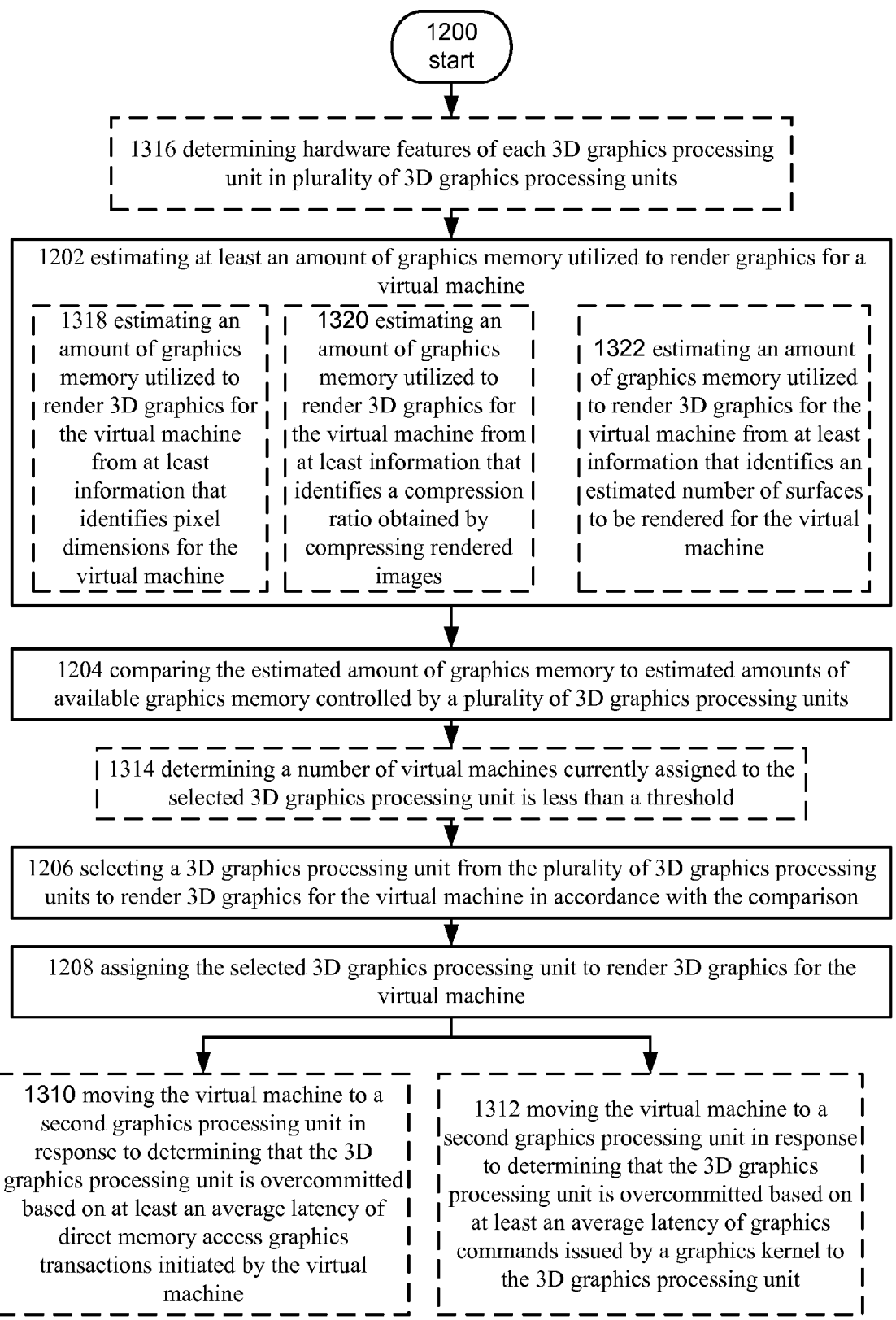
FIG. 13 illustrates the operational procedure of FIG. 12 including additional operations.

Referring to FIG. 13, it depicts the operational procedure of FIG. 13 including the additional operations 1310-1322. Operation 1310 shows moving the virtual machine to a second graphics processing unit in response to determining that the 3D graphics processing unit is overcommitted based on at least an average latency of direct memory access graphics transactions initiated by the virtual machine. For example, and referring back to FIG. 6, in an exemplary embodiment 3D graphics service manager 404 can execute on a processor and determine that 3D graphics processing unit 504 is overcommitted, e.g., 3D graphics processing unit 504 does not have enough resources to service all its requests and could be reset thereby causing graphics rendering module (506, 612, and 614) to terminate. In this specific example, the determination can be based on the average latency of DMA graphics transactions initiated by virtual machine 414. In this example, the average latency for the virtual machines can be compared to a threshold value and 3D graphics service manager 404 can be configured to determine that the resources of 3D GPU 504 are overcommitted based on at least this information. In response to the determination, 3D graphics service manager 404 can be configured to move graphics rendering module 506 to another GPU such as 3D GPU 504B or 504C.

Continuing with the description of FIG. 13, operation 1312 shows moving the virtual machine to a second graphics processing unit in response to determining that the 3D graphics processing unit is overcommitted based on at least an average latency of graphics commands issued by a graphics kernel to the 3D graphics processing unit. For example, in an exemplary embodiment information that describes the average length of time that it takes for a command issued by graphics kernel 508 before an ACK is received can be used to determine whether 3D GPU 504 is overcommitted. In this example, a table controlled by 3D graphics service manager 404 can be updated with the latency for a graphics kernel command and an average can be calculated for 3D GPU 504. The average can be compared to a threshold latency value and if the average is greater than the threshold 3D graphics service manager 404 can be configured to determine that 3D GPU 504 is overcommitted. In response to the determination, 3D graphics service manager 404 can be configured to move graphics rendering module 506 to another GPU such as 3D GPU 504B or 504C.

Turning to operation 1314, it shows determining a number of virtual machines currently assigned to the selected 3D graphics processing unit is less than a threshold. 3D graphics service manager 404 can be configured to determine to move virtual machine 414 to 3D GPU 504B in response to determining that the number of virtual machines bound to 3D GPU 504B is less than a threshold number. In this example, 3D graphics service manager 404 can be configured to read a value from its table that indicates the number of virtual machines currently bound to 3D GPU 504B (which is one in the illustrated example) and determine the number of currently bound virtual machines is less than a threshold number, i.e. a number based on performance data and/or admin preference. In this case, 3D graphics service manager 404 can be configured to move graphics rendering module 506 based on at least this determination.

Turning to operation 1316, it shows determining hardware features of each 3D graphics processing unit in plurality of 3D graphics processing units. For example, in an embodiment 3D graphics service manager 404 can be configured to determine the features of each 3D graphics processing unit in the computer system. For example, and continuing with the previous example, 3D graphics service manager 404 can be configured to determine the features of 3D graphics processing unit 504 and 3D graphics processing unit B 616. In this example, the features can be used to determine whether the graphics processing units can handle 3D graphics for virtual machines. For example, 3D graphics service manager 404 can be determined to check to see if the graphics cards support shared surfaces and textures, whether it supports at least a certain version of, for example DirectX®, the amount of graphics memory associated with the graphics processing units, etc. In this example, the information can be used to populate a table controlled by 3D graphics service manager 404 that can be used to balance graphics processing unit use among virtual machines.

Referring to operation 1318, it illustrates estimating an amount of graphics memory utilized to render 3D graphics for the virtual machine from at least information that identifies pixel dimensions for the virtual machine. For example, in an embodiment the amount of graphics memory utilized to render 3D graphics for each virtual machine can be based on the pixel dimensions associated with the virtual machine. For example, when a virtual machine is instantiated a configuration file can be received that includes information such as the desired display resolution for the virtual machine. 3D graphics service manager 404 can receive this information and use it to estimate the amount of graphics memory utilized to render 3D graphics for this virtual machine.

Turning to operation 1320, it shows estimating an amount of graphics memory utilized to render 3D graphics for the virtual machine from at least information that identifies a compression ratio used by the selected 3D graphics processing unit. For example, in an embodiment the compression ratio, i.e., the ratio between the size of a compressed image and the uncompressed image, can be used to estimate how much graphics memory a virtual machine will use to adequately render images for the virtual machine. For example, the first 3D graphics processing unit can be configured to use compressed textures to reduce their size. When 3D graphics service manager 404 interrogates the hardware, it can determine whether or not texture compression can be enabled and what compression ratio will be achieved. 3D graphics service manager 404 can use this information to estimate the amount of graphics memory that the virtual machine will use.

Operation 1322 shows estimating an amount of graphics memory utilized to render 3D graphics for the virtual machine from at least information that identifies an estimated number of surfaces to be rendered for the virtual machine. For example, in an embodiment the estimated number of surfaces that the virtual machine will attempt to render can be used to estimate the amount of graphics memory the virtual machine will use to adequately render 3D graphics for the virtual machine. For example, a surface is a way of representing an object in 3D graphics and is stored in a buffer.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer system configured to balance graphics processor use among virtual machines, comprising:
    a processor;
    a first 3D graphics processing unit;
    a second 3D graphics processing unit; and
    a memory in communication with at least the processor when the computer system is operational, the memory having stored thereon computer readable instructions that upon execution cause the processor to:
    assign a group of virtual machines to render 3D graphics on the first 3D graphics processing unit;
    determine that the first 3D graphics processing unit is overcommitted based on at least an amount of time the first 3D graphics processing unit takes to respond to commands; and
    move a first virtual machine from the group of virtual machines to the second graphics processing unit in response to at least the determination that the first 3D graphics processing unit is overcommitted.

2. The computer system of claim 1, wherein the computer readable instructions that upon execution cause the processor to move the first virtual machine to the second graphics processing unit further comprise computer readable instructions that upon execution cause the processor to:
    move the first virtual machine to the second graphics processing unit in response to determining that an estimated amount of available graphics memory controlled by the second graphics processing unit is greater than a threshold.

3. The computer system of claim 1, wherein the computer readable instructions that upon execution cause the processor to determine that the first 3D graphics processing unit is overcommitted further comprise computer readable instructions that upon execution cause the processor to:
    determine the first 3D graphics processing unit is overcommitted based on an average latency of direct memory access transactions initiated by the first virtual machine.

4. The computer system of claim 1, wherein the computer readable instructions that upon execution cause the processor to move the first virtual machine to the second graphics processing unit further comprise computer readable instructions that upon execution cause the processor to:
    move the first virtual machine in response to determining that average latency of direct memory access transactions for a second virtual machine assigned to the second graphics processing unit is less than a threshold.

5. The computer system of claim 1, wherein the computer readable instructions that upon execution cause the processor to move the first virtual machine to the second graphics processing unit further comprise computer readable instructions that upon execution cause the processor to:
    move the first virtual machine in response to determining that a number of virtual machines assigned to the second graphics processing unit is less than a threshold.

6. The computer system of claim 1, wherein the computer readable instructions further comprise computer readable instructions that upon execution cause the processor to:
    determine features of the first graphics processing unit and the second graphics processing unit.

7. A computer-readable memory device including computer-readable instructions for balancing graphics processing unit use among virtual machines, the computer-readable storage medium comprising instructions that upon execution by a processor cause the processor to:
    receive a request to assign a first virtual machine to a first 3D graphics processing unit;
    estimate an amount of graphics memory utilized to render 3D graphics for the first virtual machine;
    select the first 3D graphics processing unit from a plurality of 3D graphics processing units in response to determining that latency values associated direct memory access transactions issued by a group of virtual machines assigned to render graphics on the first 3D graphics processing unit are less than a first threshold and that the estimated amount of graphics memory utilized to render 3D graphics is less than a second threshold; and
    assign the first virtual machine to render 3D graphics on the first 3D graphics processing unit.

8. The computer-readable memory device of claim 7, wherein the computer readable instructions that upon execution cause the processor to:
    estimate an amount of graphics memory utilized to render 3D graphics for the first virtual machine from at least information that identifies pixel dimensions for each virtual machine in the group.

9. The computer-readable memory device of claim 7, wherein the computer readable instructions that upon execution cause the processor to:
    estimate an amount of graphics memory utilized to render 3D graphics for the first virtual machine from at least information that identifies a compression ratio used by the first 3D graphics processing unit.

10. The computer readable memory device of claim 7, wherein the computer readable instructions that upon execution cause the processor to:
    estimate an amount of graphics memory utilized to render 3D graphics for the first virtual machine from at least information that identifies an estimated number of surfaces to be rendered for the first virtual machine.

11. The computer-readable memory device of claim 7, wherein the computer readable instructions that upon execution cause the processor to select the first 3D graphics processing unit comprise computer readable instructions that upon execution cause the processor to:

select the first 3D graphics processing unit from the plurality of 3D graphics processing units in response to determining that a latency of at least one command issued by a graphics kernel is less than a third threshold.

12. The computer-readable memory device of claim 7, wherein the computer readable instructions that upon execution cause the processor to select the first 3D graphics processing unit comprise computer readable instructions that upon execution cause the processor to:

select the first 3D graphics processing unit from the plurality of 3D graphics processing units in response to determining that a number of virtual machines currently assigned to the first 3D graphics processing unit is less than a forth threshold.

13. A method for balancing load across graphic processing units, comprising:

estimating at least an amount of graphics memory utilized to render graphics for a virtual machine;

comparing the estimated amount of graphics memory to estimated amounts of available graphics memory controlled by a plurality of 3D graphics processing units on the same computing device;

selecting a 3D graphics processing unit from the plurality of 3D graphics processing units to render 3D graphics for the virtual machine in accordance with the comparison;

assigning the selected 3D graphics processing unit to render 3D graphics for the virtual machine; and moving the virtual machine to a second graphics processing unit in response to determining that the selected 3D graphics processing unit is overcommitted based on at least a latency of direct memory access graphics transactions initiated by the virtual machine.

14. The method of claim 13, further comprising:

moving the virtual machine to a second graphics processing unit in response to determining that the 3D graphics processing unit is overcommitted based on at least an average latency of graphics commands issued by a graphics kernel to the 3D graphics processing unit.

15. The method of claim 13, further comprising:

determining a number of virtual machines currently assigned to the selected 3D graphics processing unit is less than a threshold.

16. The method of claim 13, further comprising:

determining hardware features of each 3D graphics processing unit in plurality of 3D graphics processing units.

17. The method of claim 13, further comprising:

estimating an amount of graphics memory utilized to render 3D graphics for the virtual machine from at least information that identifies pixel dimensions for the virtual machine.

18. The method of claim 13, further comprising:

estimating an amount of graphics memory utilized to render 3D graphics for the virtual machine from at least information that identifies a compression ratio used by the selected 3D graphics processing unit.

19. The method of claim 13, further comprising:

estimating an amount of graphics memory utilized to render 3D graphics for the virtual machine from at least information that identifies an estimated number of surfaces to be rendered for the virtual machine.

* * * * *